United States Patent
Raghavan et al.

(10) Patent No.: US 12,526,030 B2
(45) Date of Patent: Jan. 13, 2026

(54) CAPABILITY INDICATION FOR A MECHANICAL DISPLACEMENT AT A CUSTOMER PREMISES EQUIPMENT

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 32 days.

(21) Appl. No.: 18/441,444

(22) Filed: Feb. 14, 2024

(65) Prior Publication Data

US 2025/0260465 A1    Aug. 14, 2025

(51) Int. Cl.
*H04L 23/02* (2006.01)
*H04B 7/06* (2006.01)
*H04B 17/12* (2015.01)
*H04B 17/318* (2015.01)

(52) U.S. Cl.
CPC ......... *H04B 7/06952* (2023.05); *H04B 17/12* (2015.01); *H04B 17/318* (2015.01)

(58) Field of Classification Search
CPC ... H04L 5/0048; H04L 7/0456; H04L 5/0023; H04B 7/0404; H04B 7/0608; H04W 16/18; H04W 4/44; H04W 40/22; H04W 40/12; H04W 52/0229; H04W 24/10; H04W 36/085
USPC .................................. 375/262, 267, 299, 260
See application file for complete search history.

(56) References Cited

U.S. PATENT DOCUMENTS

| | | | |
|---|---|---|---|
| 2002/0104044 A1* | 8/2002 | Penick | H04L 1/0001 714/39 |
| 2017/0279567 A1* | 9/2017 | Rahman | H04L 5/1469 |
| 2022/0109746 A1* | 4/2022 | Lindheimer | H04L 69/24 |
| 2022/0386262 A1* | 12/2022 | Liberg | G01S 5/0236 |
| 2023/0189012 A1* | 6/2023 | Niu | H04W 4/44 455/446 |
| 2023/0354152 A1* | 11/2023 | Bangolae | H04W 40/22 |
| 2025/0081101 A1* | 3/2025 | Soldati | H04W 36/0066 |

* cited by examiner

*Primary Examiner* — Khai Tran
(74) *Attorney, Agent, or Firm* — Harrity & Harrity, LLP

(57) ABSTRACT

Various aspects of the present disclosure generally relate to wireless communication. In some aspects, a customer premises equipment (CPE) may transmit a capability message that includes an indication of a mechanical displacement capability at the CPE. The CPE may receive an instruction to perform a radio optimization procedure that is based at least in part on the mechanical displacement capability, the radio optimization procedure comprising at least one of: a radio link monitoring (RLM) procedure, a radio resource management (RRM) procedure, or a beam management procedure. Numerous other aspects are described.

20 Claims, 12 Drawing Sheets

| DRX cycle length [s] | Scaling Factor (N1) | | | | T detect, NR_Inter [s](number of DRX cycles) | T measure, NR_Inter [s](number of DRX cycles) | T evaluate, NR_Inter [s] (number of DRX cycles) |
|---|---|---|---|---|---|---|---|
| | FR1-1 *Note 3 | FR1-2 *Note 4 | FR2-1 *Note 1 | FR2-2 *Note 2 | | | |
| 0.32 | 1 | 5 | 8 | 12 | 11.52 × N1 × 1.5 (36 × N1 × 1.5) | 1.28 × N1 × 1.5 (4 × N1 × 1.5) | 5.12 × N1 × 1.5 (16 × N1 × 1.5) |
| 0.64 | | | 5 | 8 | 17.92 × N1 (28 × N1) | 1.28 × N1 (2 × N1) | 5.12 × N1 (8 × N1) |
| 1.28 | | | 4 | 6 | 32 × N1 (25 × N1) | 1.28 × N1 (1 × N1) | 6.4 × N1 (5 × N1) |
| 2.56 | | | 3 | 5 | 58.88 × N1 (23 × N1) | 2.56 × N1 (1 × N1) | 7.68 × N1 (3 × N1) |

Note 1: Applies for UE supporting FR2-1 power class 1 or 5, N1= 8 for all DRX cycle length class 1, N1= 12 for all DRX cycle length Note 2: Applies for UE supporting FR2-2 power class 1, N1= 12 for all DRX cycle length Note 3: Applies for UEs that do not support an FR1 mechanical displacement capability power class Note 4: Applies for UEs that support an FR1 mechanical displacement capability power class

FIG. 6B

CAPABILITY INDICATION FOR A MECHANICAL DISPLACEMENT AT A CUSTOMER PREMISES EQUIPMENT

FIELD OF THE DISCLOSURE

Aspects of the present disclosure generally relate to wireless communication and specifically relate to techniques, apparatuses, and methods for a capability indication for a mechanical displacement at a customer premises equipment.

BACKGROUND

Wireless communication systems are widely deployed to provide various services that may include carrying voice, text, messaging, video, data, and/or other traffic. The services may include unicast, multicast, and/or broadcast services, among other examples. Typical wireless communication systems may employ multiple-access radio access technologies (RATs) capable of supporting communication with multiple users by sharing available system resources (for example, time domain resources, frequency domain resources, spatial domain resources, and/or device transmit power, among other examples). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access RATs have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies (for example, cellular vehicle-to-everything (CV2X) communication), massive multiple-input multiple-output (MIMO), disaggregated network architectures and network topology expansions, multiple-subscriber implementations, high-precision positioning, and/or radio frequency (RF) sensing, among other examples. As the demand for mobile broadband access continues to increase, further improvements in NR may be implemented, and other radio access technologies such as 6G may be introduced, to further advance mobile broadband evolution.

SUMMARY

Some aspects described herein relate to a method of wireless communication performed by a customer premises equipment (CPE). The method may include transmitting a capability message that includes an indication of a mechanical displacement capability at the CPE. The method may include receiving an instruction to perform a radio optimization procedure that is based at least in part on the mechanical displacement capability, the radio optimization procedure comprising at least one of: a radio link monitoring (RLM) procedure, a radio resource management (RRM) procedure, or a beam management procedure.

Some aspects described herein relate to a method of wireless communication performed by a network node. The method may include receiving a capability message that includes an indication of a mechanical displacement capability at a CPE. The method may include transmitting an instruction to perform a radio optimization procedure that is based at least in part on the mechanical displacement capability, the radio optimization procedure comprising at least one of: an RLM procedure, an RRM procedure, or a beam management procedure.

Some aspects described herein relate to an apparatus for wireless communication at a CPE. The apparatus may include one or more memories and one or more processors coupled to the one or more memories. The one or more processors may be configured, individually or collectively, to transmit a capability message that includes an indication of a mechanical displacement capability at the CPE. The one or more processors may be configured to receive an instruction to perform a radio optimization procedure that is based at least in part on the mechanical displacement capability, the radio optimization procedure comprising at least one of: an RLM procedure, an RRM procedure, or a beam management procedure.

Some aspects described herein relate to an apparatus for wireless communication at a network node. The apparatus may include one or more memories and one or more processors coupled to the one or more memories. The one or more processors may be configured, individually or collectively, to receive a capability message that includes an indication of a mechanical displacement capability at a CPE. The one or more processors may be configured to transmit an instruction to perform a radio optimization procedure that is based at least in part on the mechanical displacement capability, the radio optimization procedure comprising at least one of: an RLM procedure, an RRM procedure, or a beam management procedure.

Some aspects described herein relate to a non-transitory computer-readable medium that stores a set of instructions for wireless communication by a CPE. The set of instructions, when executed by one or more processors of the CPE, may cause the CPE to transmit a capability message that includes an indication of a mechanical displacement capability at the CPE. The set of instructions, when executed by one or more processors of the CPE, may cause the CPE to receive an instruction to perform a radio optimization procedure that is based at least in part on the mechanical displacement capability, the radio optimization procedure comprising at least one of: an RLM procedure, an RRM procedure, or a beam management procedure.

Some aspects described herein relate to a non-transitory computer-readable medium that stores a set of instructions for wireless communication by a network node. The set of instructions, when executed by one or more processors of the network node, may cause the network node to receive a capability message that includes an indication of a mechanical displacement capability at a CPE. The set of instructions, when executed by one or more processors of the network node, may cause the network node to transmit an instruction to perform a radio optimization procedure that is based at least in part on the mechanical displacement capability, the radio optimization procedure comprising at least one of: an RLM procedure, an RRM procedure, or a beam management procedure.

Some aspects described herein relate to an apparatus for wireless communication. The apparatus may include means for transmitting a capability message that includes an indication of a mechanical displacement capability at the apparatus. The apparatus may include means for receiving an instruction to perform a radio optimization procedure that is based at least in part on the mechanical displacement capability, the radio optimization procedure comprising at least one of: an RLM procedure, an RRM procedure, or a beam management procedure.

Some aspects described herein relate to an apparatus for wireless communication. The apparatus may include means for receiving a capability message that includes an indication of a mechanical displacement capability at a CPE. The apparatus may include means for transmitting an instruction to perform a radio optimization procedure that is based at least in part on the mechanical displacement capability, the radio optimization procedure comprising at least one of: an RLM procedure, an RRM procedure, or a beam management procedure.

Aspects of the present disclosure may generally be implemented by or as a method, apparatus, system, computer program product, non-transitory computer-readable medium, user equipment, base station, network node, network entity, wireless communication device, and/or processing system as substantially described with reference to, and as illustrated by, the specification and accompanying drawings.

The foregoing paragraphs of this section have broadly summarized some aspects of the present disclosure. These and additional aspects and associated advantages will be described hereinafter. The disclosed aspects may be used as a basis for modifying or designing other aspects for carrying out the same or similar purposes of the present disclosure. Such equivalent aspects do not depart from the scope of the appended claims. Characteristics of the aspects disclosed herein, both their organization and method of operation, together with associated advantages, will be better understood from the following description when considered in connection with the accompanying drawings.

BRIEF DESCRIPTION OF THE DRAWINGS

The appended drawings illustrate some aspects of the present disclosure, but are not limiting of the scope of the present disclosure because the description may enable other aspects. Each of the drawings is provided for purposes of illustration and description, and not as a definition of the limits of the claims. The same or similar reference numbers in different drawings may identify the same or similar elements.

FIGS. 6A and 6B are diagrams illustrating a first example and a second example, respectively, of timing conditions for performing a radio optimization procedure, in accordance with the present disclosure.

DETAILED DESCRIPTION

Figure 1:
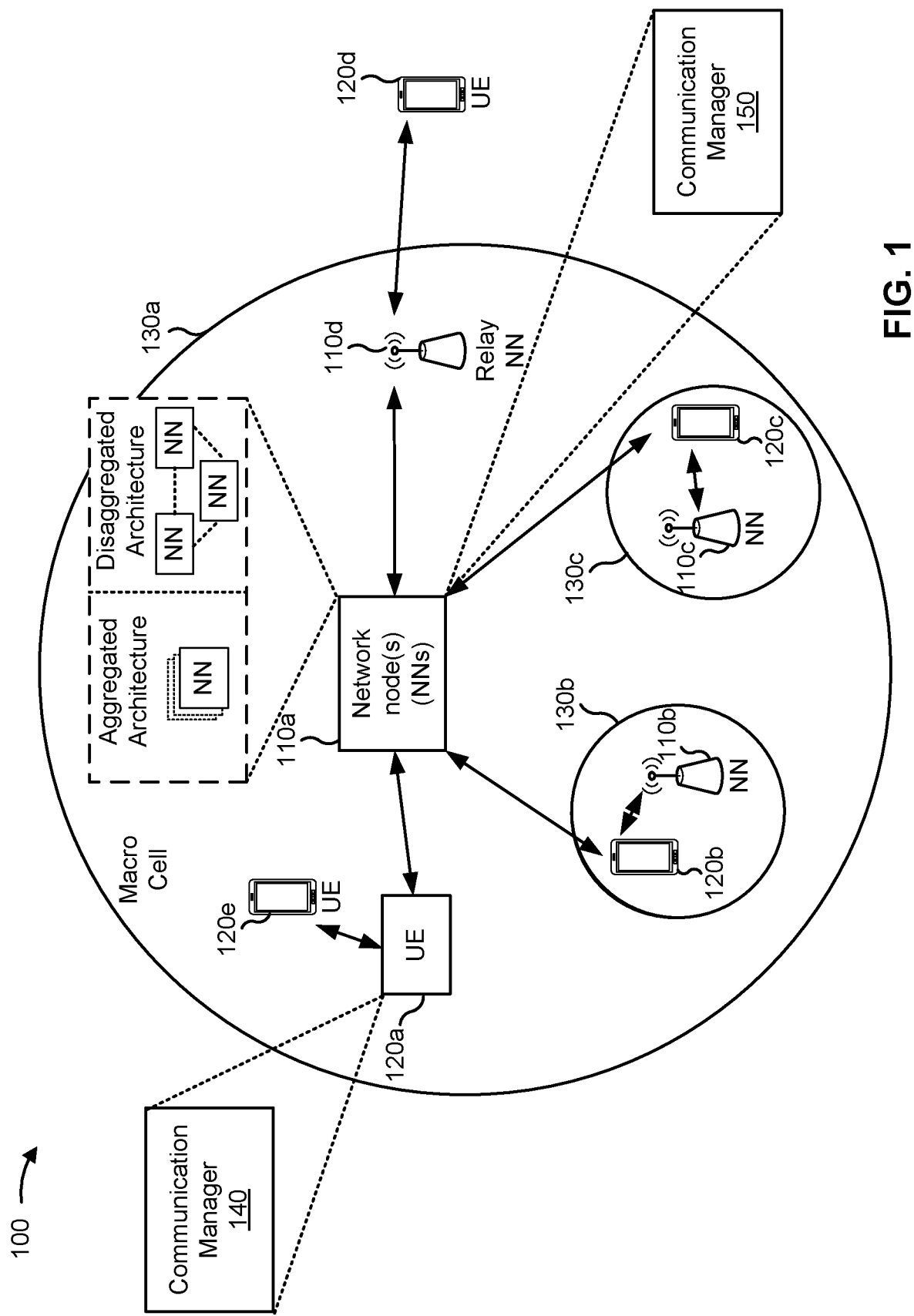
FIG. 1 is a diagram illustrating an example of a wireless communication network in accordance with the present disclosure.

Various aspects of the present disclosure are described hereinafter with reference to the accompanying drawings. However, aspects of the present disclosure may be embodied in many different forms and is not to be construed as limited to any specific aspect illustrated by or described with reference to an accompanying drawing or otherwise presented in this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or in combination with any other aspect of the disclosure. For example, an apparatus may be implemented or a method may be practiced using various combinations or quantities of the aspects set forth herein. In addition, the scope of the disclosure is intended to cover an apparatus having, or a method that is practiced using, other structures and/or functionalities in addition to or other than the structures and/or functionalities with which various aspects of the disclosure set forth herein may be practiced. Any aspect of the disclosure disclosed herein may be embodied by one or more elements of a claim.

Several aspects of telecommunication systems will now be presented with reference to various methods, operations, apparatuses, and techniques. These methods, operations, apparatuses, and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

A user equipment (UE) may be implemented as a customer premises equipment (CPE) and/or a telecommunications device that may be installed at a customer location to enable access to a service provider's network. For example, a CPE may act as an intermediary device and/or an interface device between a service provider network and a UE (e.g., a mobile phone, a tablet, a desktop computer, a smart watch, and/or an Internet of Things (IoT) device). Some example CPEs may include a modem, a router, a switch, a repeater, and/or an adapter.

To reduce implementation costs, CPEs have evolved from using a large antenna array (e.g., an 8×8 antenna array, a 16×8 antenna array, and/or a 16×16 antenna array) to using a small antenna array (e.g., a 4×4 antenna array, a 2×1 antenna array, and/or a 2×2 antenna array). "Large antenna array" and "small antenna array" may denote relative comparisons between antenna array sizes that are based at least in part on a respective number of antenna elements included in each antenna array and/or a respective physical aperture of each antenna array. Accordingly, a large antenna array may include more antenna elements and/or may have a larger physical size relative to a small antenna array.

A CPE that uses a small antenna array may also include a reflector and/or a mechanical rotator to increase an effective aperture size of the antenna array and/or increase a signal quality (e.g., increase a power level associated with the array gain of a beamformed wireless signal). As one example, the reflector may focus a wireless signal transmitted and/or received by the antenna array in a manner that concentrates an energy and/or signal power of the wireless signal. As another example, the CPE may rotate the antenna panel to a location that is within a line-of-sight (LoS) of a device that communicates with the CPE, such as a UE that changes locations in mobility considerations.

While mechanical displacement of an antenna panel and/or a reflector may improve a signal quality (e.g., a signal strength), the movement from a first position to a second position may take a significant amount of time in the context of wireless communications associated with mechanical movements. For instance, the movement from the first position to the second position may take a duration that spans a few seconds and/or tens of seconds, while wireless communications may have timing conditions that are characterized in microseconds and/or milliseconds. During the mechanical displacement, a CPE may be non-functional and/or unavailable to support transmissions with another device. The duration of the mechanical displacement and the unavailability of the CPE during the mechanical displacement may adversely affect a radio optimization procedure, such as a radio resource management (RRM) procedure, a radio link monitoring (RLM) procedure, and/or a beam management procedure.

To illustrate, a communication standard may specify an operating condition for a radio optimization procedure, such as a timing condition for the CPE to calculate one or more inter-frequency cell measurements within a time period and/or with a periodicity. Accordingly, as part of performing the radio optimization procedure, the CPE may generate a measurement metric during a time span in which the CPE is performing a mechanical displacement and is non-functional, resulting in an erroneous measurement metric that is used to select a communication configuration and/or is used to determine a state of a communication link. Using an erroneous measurement metric to select a communication configuration and/or to determinate a state of a communication link may result in sub-optimal selections by, and/or failure of, the radio optimization procedure and, consequently, disruptions to communications at the CPE. For example, sub-optimal selections by, and/or failure of, the radio optimization procedure may result in any combination of a handover failure, unreliable network service, and/or battery drain at the CPE.

Various aspects relate generally to a capability indication for a mechanical displacement at a CPE. Some aspects more specifically relate to a CPE and/or a network node performing a radio optimization procedure that includes a latency to account for the mechanical displacement at the CPE. In some aspects, the CPE may transmit a capability message that indicates a mechanical displacement capability at the CPE. To illustrate, the CPE may transmit a capability message that indicates any combination of a repositioning duration, a repositioning rate, and/or a displacement range. Based at least in part on transmitting the capability message that indicates the mechanical displacement capability, the CPE may receive an instruction to perform a radio optimization procedure that is based at least in part on the mechanical displacement capability. Some examples of a radio optimization procedure may include an RLM procedure, an RRM procedure, and/or a beam management procedure, and the radio optimization procedure may be based at least in part on a time span and/or periodicity that is configured to accommodate the mechanical displacement (e.g., includes a latency that accommodates a duration for performing the mechanical displacement).

In some aspects, a network node may receive a capability message that indicates a mechanical displacement capability at a CPE. Based at least in part on receiving the capability message that indicates the mechanical displacement capability, the network node may transmit an instruction to perform a radio optimization procedure that is based at least in part on the mechanical displacement capability, such as an instruction to perform any combination of an RLM procedure, an RRM procedure, and/or a beam management procedure using the time span and/or periodicity that is configured to accommodate the mechanical displacement.

Particular aspects of the subject matter described in this disclosure can be implemented to realize one or more of the following potential advantages. In some examples, by a CPE indicating a mechanical displacement capability, the described techniques can be used to enable a network node, or other devices, to configure a radio optimization procedure using a time span and/or a periodicity that accommodates the mechanical displacement and/or mitigates erroneous measurement metrics that are generated during the mechanical displacement. Alternatively, or additionally, the network node may configure the radio optimization procedure to generate information about different mechanical positions, as described below. For instance, the network node may configure the radio optimization procedure to use a time span and/or a periodicity that has been adjusted and/or modified to mitigate a measurement being calculated during a time span in which the CPE is non-functioning. Avoiding the generation of a measurement during a time span in which CPE is non-functioning may mitigate a sub-optimal selection by, and/or failure of, a radio optimization procedure that may result in any combination of a handover failure, unreliable network service, and/or battery drain at the UE.

Multiple-access radio access technologies (RATs) have been adopted in various telecommunication standards to provide common protocols that enable wireless communication devices to communicate on a municipal, enterprise, national, regional, or global level. For example, 5G New Radio (NR) is part of a continuous mobile broadband evolution promulgated by the Third Generation Partnership Project (3GPP). 5G NR supports various technologies and use cases including enhanced mobile broadband (eMBB), ultra-reliable low-latency communication (URLLC), massive machine-type communication (mMTC), millimeter wave (mmWave) technology, beamforming, network slicing, edge computing, IoT connectivity and management, and network function virtualization (NFV).

As the demand for broadband access increases and as technologies supported by wireless communication networks evolve, further technological improvements may be adopted in or implemented for 5G NR or future RATs, such as 6G, to further advance the evolution of wireless communication for a wide variety of existing and new use cases and applications. Such technological improvements may be associated with new frequency band expansion, licensed and unlicensed spectrum access, overlapping spectrum use, small cell deployments, non-terrestrial network (NTN) deployments, disaggregated network architectures and network topology expansion, device aggregation, advanced duplex communication, sidelink and other device-to-device direct communication, IoT (including passive or ambient IoT) networks, reduced capability (RedCap) UE functionality, industrial connectivity, multiple-subscriber implementations, high-precision positioning, radio frequency (RF) sensing, and/or artificial intelligence or machine learning (AI/ML), among other examples. These technological improvements may support use cases such as wireless backhauls, wireless data centers, extended reality (XR) and metaverse applications, meta services for supporting vehicle connectivity, holographic and mixed reality communication, autonomous and collaborative robots, vehicle platooning and cooperative maneuvering, sensing networks, gesture monitoring, human-brain interfacing, digital twin applications, asset management, and universal coverage applications using non-terrestrial and/or aerial platforms, among other examples. The methods, operations, apparatuses, and techniques described herein may enable one or more of the foregoing technologies and/or support one or more of the foregoing use cases.

FIG. 1 is a diagram illustrating an example of a wireless communication network 100 in accordance with the present disclosure. The wireless communication network 100 may be or may include elements of a 5G (or NR) network or a 6G network, among other examples. The wireless communication network 100 may include multiple network nodes 110, shown as a network node (NN) 110a, a network node 110b, a network node 110c, and a network node 110d, The network nodes 110 may support communications with multiple UEs 120, shown as a UE 120a, a UE 120b, a UE 120c, a UE 120d, and a UE 120e.

The network nodes 110 and the UEs 120 of the wireless communication network 100 may communicate using the electromagnetic spectrum, which may be subdivided by frequency or wavelength into various classes, bands, carriers, and/or channels. For example, devices of the wireless communication network 100 may communicate using one or more operating bands. In some aspects, multiple wireless networks 100 may be deployed in a given geographic area. Each wireless communication network 100 may support a particular RAT (which may also be referred to as an air interface) and may operate on one or more carrier frequencies in one or more frequency ranges. Examples of RATs include a 4G RAT, a 5G/NR RAT, and/or a 6G RAT, among other examples. In some examples, when multiple RATs are deployed in a given geographic area, each RAT in the geographic area may operate on different frequencies to avoid interference with one another.

Various operating bands have been defined as frequency range designations FR1 (410 MHz through 7.125 GHz), FR2 (24.25 GHz through 52.6 GHz), FR3 (7.125 GHz through 24.25 GHz), FR4a or FR4-1 (52.6 GHz through 71 GHz), FR4 (52.6 GHz through 114.25 GHZ), and FR5 (114.25 GHz through 300 GHz). Although a portion of FR1 is greater than 6 GHz, FR1 is often referred to (interchangeably) as a "Sub-6 GHz" band in some documents and articles. Similarly, FR2 is often referred to (interchangeably) as a "millimeter wave" band in some documents and articles, despite being different than the extremely high frequency (EHF) band (30 GHz through 300 GHz), which is identified by the International Telecommunications Union (ITU) as a "millimeter wave" band. The frequencies between FR1 and FR2 are often referred to as mid-band frequencies, which include FR3. Frequency bands falling within FR3 may inherit FR1 characteristics or FR2 characteristics, and thus may effectively extend features of FR1 or FR2 into mid-band frequencies. Thus, "sub-6 GHZ," if used herein, may broadly refer to frequencies that are less than 6 GHZ, that are within FR1, and/or that are included in mid-band frequencies. Similarly, the term "millimeter wave," if used herein, may broadly refer to frequencies that are included in mid-band frequencies, that are within FR2, FR4, FR4-a or FR4-1, or FR5, and/or that are within the EHF band. Higher frequency bands may extend 5G NR operation, 6G operation, and/or other RATs beyond 52.6 GHz. For example, each of FR4a, FR4-1, FR4, and FR5 falls within the EHF band. In some examples, the wireless communication network 100 may implement dynamic spectrum sharing (DSS), in which multiple RATs (for example, 4G/LTE and 5G/NR) are implemented with dynamic bandwidth allocation (for example, based on user demand) in a single frequency band. It is contemplated that the frequencies included in these operating bands (for example, FR1, FR2, FR3, FR4, FR4-a, FR4-1, and/or FR5) may be modified, and techniques described herein may be applicable to those modified frequency ranges.

A network node 110 may include one or more devices, components, or systems that enable communication between a UE 120 and one or more devices, components, or systems of the wireless communication network 100. A network node 110 may be, may include, or may also be referred to as an NR network node, a 5G network node, a 6G network node, a Node B, an eNB, a gNB, an access point (AP), a transmission reception point (TRP), a mobility element, a core, a network entity, a network element, a network equipment, and/or another type of device, component, or system included in a radio access network (RAN).

A network node 110 may be implemented as a single physical node (for example, a single physical structure) or may be implemented as two or more physical nodes (for example, two or more distinct physical structures). For example, a network node 110 may be a device or system that implements part of a radio protocol stack, a device or system that implements a full radio protocol stack (such as a full gNB protocol stack), or a collection of devices or systems that collectively implement the full radio protocol stack. For example, and as shown, a network node 110 may be an aggregated network node (having an aggregated architecture), meaning that the network node 110 may implement a full radio protocol stack that is physically and logically integrated within a single node (for example, a single physical structure) in the wireless communication network 100. For example, an aggregated network node 110 may consist of a single standalone base station or a single TRP that uses a full radio protocol stack to enable or facilitate communication between a UE 120 and a core network of the wireless communication network 100.

Alternatively, and as also shown, a network node 110 may be a disaggregated network node (sometimes referred to as a disaggregated base station), meaning that the network node 110 may implement a radio protocol stack that is physically distributed and/or logically distributed among two or more nodes in the same geographic location or in different geographic locations. For example, a disaggregated network node may have a disaggregated architecture. In some deployments, disaggregated network nodes 110 may be used in an integrated access and backhaul (IAB) network, in an open radio access network (O-RAN) (such as a network configuration in compliance with the O-RAN Alliance), or in a virtualized radio access network (vRAN), also known as a cloud radio access network (C-RAN), to facilitate scaling by separating base station functionality into multiple units that can be individually deployed.

The network nodes 110 of the wireless communication network 100 may include one or more central units (CUs), one or more distributed units (DUs), and/or one or more radio units (RUs). A CU may host one or more higher layer control functions, such as radio resource control (RRC) functions, packet data convergence protocol (PDCP) functions, and/or service data adaptation protocol (SDAP) functions, among other examples. A DU may host one or more of a radio link control (RLC) layer, a medium access control (MAC) layer, and/or one or more higher physical (PHY) layers depending, at least in part, on a functional split, such as a functional split defined by the 3GPP. In some examples, a DU also may host one or more lower PHY layer functions, such as a fast Fourier transform (FFT), an inverse FFT (iFFT), beamforming, physical random access channel (PRACH) extraction and filtering, and/or scheduling of resources for one or more UEs 120, among other examples. An RU may host RF processing functions or lower PHY layer functions, such as an FFT, an iFFT, beamforming, or PRACH extraction and filtering, among other examples, according to a functional split, such as a lower layer functional split. In such an architecture, each RU can be operated to handle over the air (OTA) communication with one or more UEs 120.

In some aspects, a single network node 110 may include a combination of one or more CUs, one or more DUs, and/or one or more RUs. Additionally or alternatively, a network node 110 may include one or more Near-Real Time (Near-RT) RAN Intelligent Controllers (RICs) and/or one or more Non-Real Time (Non-RT) RICs. In some examples, a CU, a DU, and/or an RU may be implemented as a virtual unit, such as a virtual central unit (VCU), a virtual distributed unit (VDU), or a virtual radio unit (VRU), among other examples. A virtual unit may be implemented as a virtual network function, such as associated with a cloud deployment.

Some network nodes 110 (for example, a base station, an RU, or a TRP) may provide communication coverage for a particular geographic area. In the 3GPP, the term "cell" can refer to a coverage area of a network node 110 or to a network node 110 itself, depending on the context in which the term is used. A network node 110 may support one or multiple (for example, three) cells. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In some examples, a cell may not necessarily be stationary. For example, the geographic area of the cell may move according to the location of an associated mobile network node 110 (for example, a train, a satellite base station, an unmanned aerial vehicle, or an NTN network node).

The wireless communication network 100 may be a heterogeneous network that includes network nodes 110 of different types, such as macro network nodes, pico network nodes, femto network nodes, relay network nodes, aggregated network nodes, and/or disaggregated network nodes, among other examples. In the example shown in FIG. 1, the network node 110a may be a macro network node for a macro cell 130a, the network node 110b may be a pico network node for a pico cell 130b, and the network node 110c may be a femto network node for a femto cell 130c, Various different types of network nodes 110 may generally transmit at different power levels, serve different coverage areas, and/or have different impacts on interference in the wireless communication network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts).

In some examples, a network node 110 may be, may include, or may operate as an RU, a TRP, or a base station that communicates with one or more UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels and one or more data channels. A downlink control channel may be used to transmit downlink control information (DCI) (for example, scheduling information, reference signals, and/or configuration information) from a network node 110 to a UE 120. A downlink data channel may be used to transmit downlink data (for example, user data associated with a UE 120) from a network node 110 to a UE 120. Downlink control channels may include one or more physical downlink control channels (PDCCHs), and downlink data channels may include one or more physical downlink shared channels (PDSCHs). Uplink channels may similarly include one or more control channels and one or more data channels. An uplink control channel may be used to transmit uplink control information (UCI) (for example, reference signals and/or feedback corresponding to one or more downlink transmissions) from a UE 120 to a network node 110. An uplink data channel may be used to transmit uplink data (for example, user data associated with a UE 120) from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Downlink and uplink resources may include time domain resources (frames, subframes, slots, and/or symbols), frequency domain resources (frequency bands, component carriers, subcarriers, resource blocks, and/or resource elements), and/or spatial domain resources (particular transmit directions and/or beam parameters). Frequency domain resources of some bands may be subdivided into bandwidth parts (BWPs). A BWP may be a continuous block of frequency domain resources (for example, a continuous block of resource blocks) that are allocated for one or more UEs 120. A UE 120 may be configured with both an uplink BWP and a downlink BWP (where the uplink BWP and the downlink BWP may be the same BWP or different BWPs). A BWP may be dynamically configured (for example, by a network node 110 transmitting a DCI configuration to the one or more UEs 120) and/or reconfigured, which means that a BWP can be adjusted in real-time (or near-real-time) based on changing network conditions in the wireless communication network 100 and/or based on the specific requirements of the one or more UEs 120. This enables more efficient use of the available frequency domain resources in the wireless communication network 100 because fewer frequency domain resources may be allocated to a BWP for a UE 120 (which may reduce the quantity of frequency domain resources that a UE 120 is required to monitor), leaving more frequency domain resources to be spread across multiple UEs 120. Thus, BWPs may also assist in the implementation of lower-capability UEs 120 by facilitating the configuration of smaller bandwidths for communication by such UEs 120.

As described above, in some aspects, the wireless communication network 100 may be, may include, or may be included in, an IAB network. In an IAB network, at least one network node 110 is an anchor network node that communicates with a core network. An anchor network node 110 may also be referred to as an IAB donor (or "IAB-donor"). The anchor network node 110 may connect to the core network via a wired backhaul link. For example, an Ng interface of the anchor network node 110 may terminate at the core network. Additionally or alternatively, an anchor network node 110 may connect to one or more devices of the core network that provide a core access and mobility management function (AMF). An IAB network also generally includes multiple non-anchor network nodes 110, which may also be referred to as relay network nodes or simply as IAB nodes (or "IAB-nodes"). Each non-anchor network node 110 may communicate directly with the anchor network node 110 via a wireless backhaul link to access the core network, or may communicate indirectly with the anchor network node 110 via one or more other non-anchor network nodes 110 and associated wireless backhaul links that form a backhaul path to the core network. Some anchor network node 110 or other non-anchor network node 110 may also communicate directly with one or more UEs 120 via wireless access links that carry access traffic. In some examples, network resources for wireless communication (such as time resources, frequency resources, and/or spatial resources) may be shared between access links and backhaul links.

In some examples, any network node 110 that relays communications may be referred to as a relay network node, a relay station, or simply as a relay. A relay may receive a transmission of a communication from an upstream station (for example, another network node 110 or a UE 120) and transmit the communication to a downstream station (for example, a UE 120 or another network node 110). In this case, the wireless communication network 100 may include or be referred to as a "multi-hop network." In the example shown in FIG. 1, the network node 110*d* (for example, a relay network node) may communicate with the network node 110*a* (for example, a macro network node) and the UE 120*d* in order to facilitate communication between the network node 110*a* and the UE 120*d*. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless communication network 100, and each UE 120 may be stationary or mobile. A UE 120 may be, may include, or may be included in an access terminal, another terminal, a mobile station, or a subscriber unit. A UE 120 may be, include, or be coupled with a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, and/or smart jewelry, such as a smart ring or a smart bracelet), an entertainment device (for example, a music device, a video device, and/or a satellite radio), an XR device, a vehicular component or sensor, a smart meter or sensor, industrial manufacturing equipment, a Global Navigation Satellite System (GNSS) device (such as a Global Positioning System device or another type of positioning device), a UE function of a network node, and/or any other suitable device or function that may communicate via a wireless medium.

A UE 120 and/or a network node 110 may include one or more chips, system-on-chips (SoCs), chipsets, packages, or devices that individually or collectively constitute or comprise a processing system. The processing system includes processor (or "processing") circuitry in the form of one or multiple processors, microprocessors, processing units (such as central processing units (CPUs), graphics processing units (GPUs), neural processing units (NPUs) and/or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein. A group of processors collectively configurable or configured to perform a set of functions may include a first processor configurable or configured to perform a first function of the set and a second processor configurable or configured to perform a second function of the set, or may include the group of processors all being configured or configurable to perform the set of functions.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled (for example, operatively coupled, communicatively coupled, electronically coupled, or electrically coupled) with one or more of the processors and may individually or collectively store processor-executable code (such as software) that, when executed by one or more of the processors, may configure one or more of the processors to perform various functions or operations described herein. Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G, or 6G compliant) modem). In some implementations, one or more processors of the processing system include or implement one or more of the modems. The processing system may further include or be coupled with multiple radios (collectively "the radio"), multiple RF chains, or multiple transceivers, each of which may in turn be coupled with one or more of multiple antennas. In some implementations, one or more processors of the processing system include or implement one or more of the radios, RF chains or transceivers. The UE 120 may include or may be included in a housing that houses components associated with the UE 120 including the processing system.

Some UEs 120 may be considered machine-type communication (MTC) UEs, evolved or enhanced machine-type communication (eMTC), UEs, further enhanced eMTC (feMTC) UEs, or enhanced feMTC (efeMTC) UEs, or further evolutions thereof, all of which may be simply referred to as "MTC UEs"). An MTC UE may be, may include, or may be included in or coupled with a robot, an uncrewed aerial vehicle, a remote device, a sensor, a meter, a monitor, and/or a location tag. Some UEs 120 may be considered IoT devices and/or may be implemented as NB-IoT (narrowband IoT) devices. An IoT UE or NB-IoT device may be, may include, or may be included in or coupled with an industrial machine, an appliance, a refrigerator, a doorbell camera device, a home automation device, and/or a light fixture, among other examples. Some UEs 120 may be considered CPEs, which may include telecommunications devices that are installed at a customer location (such as a home or office) to enable access to a service provider's network (such as included in or in communication with the wireless communication network 100).

Some UEs 120 may be classified according to different categories in association with different complexities and/or different capabilities. UEs 120 in a first category may facilitate massive IoT in the wireless communication network 100, and may offer low complexity and/or cost relative to UEs 120 in a second category. UEs 120 in a second category may include mission-critical IoT devices, legacy UEs, baseline UEs, high-tier UEs, advanced UEs, full-capability UEs, and/or premium UEs that are capable of URLLC, enhanced mobile broadband (eMBB), and/or precise positioning in the wireless communication network 100, among other examples. A third category of UEs 120 may have mid-tier complexity and/or capability (for example, a capability between UEs 120 of the first category and UEs 120 of the second capability). A UE 120 of the third category may be referred to as a reduced capacity UE ("RedCap UE"), a mid-tier UE, an NR-Light UE, and/or an NR-Lite UE, among other examples. RedCap UEs may bridge a gap between the capability and complexity of NB-IoT devices and/or eMTC UEs, and mission-critical IoT devices and/or premium UEs. RedCap UEs may include, for example, wearable devices, IoT devices, industrial sensors, and/or cameras that are associated with a limited bandwidth, power capacity, and/or transmission range, among other examples. RedCap UEs may support healthcare environments, building automation, electrical distribution, process automation, transport and logistics, and/or smart city deployments, among other examples.

In some examples, two or more UEs 120 (for example, shown as UE 120a and UE 120e) may communicate directly with one another using sidelink communications (for example, without communicating by way of a network node 110 as an intermediary). As an example, the UE 120a may directly transmit data, control information, or other signaling as a sidelink communication to the UE 120e, This is in contrast to, for example, the UE 120a first transmitting data in an UL communication to a network node 110, which then transmits the data to the UE 120e in a DL communication. In various examples, the UEs 120 may transmit and receive sidelink communications using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, and/or vehicle-to-pedestrian (V2P) protocols), and/or mesh network communication protocols. In some deployments and configurations, a network node 110 may schedule and/or allocate resources for sidelink communications between UEs 120 in the wireless communication network 100. In some other deployments and configurations, a UE 120 (instead of a network node 110) may perform, or collaborate or negotiate with one or more other UEs to perform, scheduling operations, resource selection operations, and/or other operations for sidelink communications.

In various examples, some of the network nodes 110 and the UEs 120 of the wireless communication network 100 may be configured for full-duplex operation in addition to half-duplex operation. A network node 110 or a UE 120 operating in a half-duplex mode may perform only one of transmission or reception during particular time resources, such as during particular slots, symbols, or other time periods. Half-duplex operation may involve time-division duplexing (TDD), in which DL transmissions of the network node 110 and UL transmissions of the UE 120 do not occur in the same time resources (that is, the transmissions do not overlap in time). In contrast, a network node 110 or a UE 120 operating in a full-duplex mode can transmit and receive communications concurrently (for example, in the same time resources). By operating in a full-duplex mode, network nodes 110 and/or UEs 120 may generally increase the capacity of the network and the radio access link. In some examples, full-duplex operation may involve frequency-division duplexing (FDD), in which DL transmissions of the network node 110 are performed in a first frequency band or on a first component carrier and transmissions of the UE 120 are performed in a second frequency band or on a second component carrier different than the first frequency band or the first component carrier, respectively. In some examples, full-duplex operation may be enabled for a UE 120 but not for a network node 110. For example, a UE 120 may simultaneously transmit an UL transmission to a first network node 110 and receive a DL transmission from a second network node 110 in the same time resources. In some other examples, full-duplex operation may be enabled for a network node 110 but not for a UE 120. For example, a network node 110 may simultaneously transmit a DL transmission to a first UE 120 and receive an UL transmission from a second UE 120 in the same time resources. In some other examples, full-duplex operation may be enabled for both a network node 110 and a UE 120.

In some examples, the UEs 120 and the network nodes 110 may perform MIMO communication. "MIMO" generally refers to transmitting or receiving multiple signals (such as multiple layers or multiple data streams) simultaneously over the same time and frequency resources. MIMO techniques generally exploit multipath propagation. MIMO may be implemented using various spatial processing or spatial multiplexing operations. In some examples, MIMO may support simultaneous transmission to multiple receivers, referred to as multi-user MIMO (MU-MIMO). Some RATs may employ advanced MIMO techniques, such as mTRP operation (including redundant transmission or reception on multiple TRPs), reciprocity in the time domain or the frequency domain, single-frequency-network (SFN) transmission, or non-coherent joint transmission (NC-JT).

In some aspects, a CPE (e.g., a UE 120 and/or an apparatus 900) may include a communication manager 140. As described in more detail elsewhere herein, the communication manager 140 may transmit a capability message that includes an indication of a mechanical displacement capability at the CPE; and receive an instruction to perform a radio optimization procedure that is based at least in part on the mechanical displacement capability, the radio optimization procedure comprising at least one of: an RLM procedure, an RRM procedure, or a beam management procedure. Additionally, or alternatively, the communication manager 140 may perform one or more other operations described herein.

In some aspects, a network node (e.g., a network node 110) may include a communication manager 150. As described in more detail elsewhere herein, the communication manager 150 may receive a capability message that includes an indication of a mechanical displacement capability at CPE; and transmit an instruction to perform a radio optimization procedure that is based at least in part on the mechanical displacement capability, the radio optimization procedure comprising at least one of: an RLM procedure, an RRM procedure, or a beam management procedure. Additionally, or alternatively, the communication manager 150 may perform one or more other operations described herein.

As indicated above, FIG. 1 is provided as an example. Other examples may differ from what is described with regard to FIG. 1.

Figure 2:
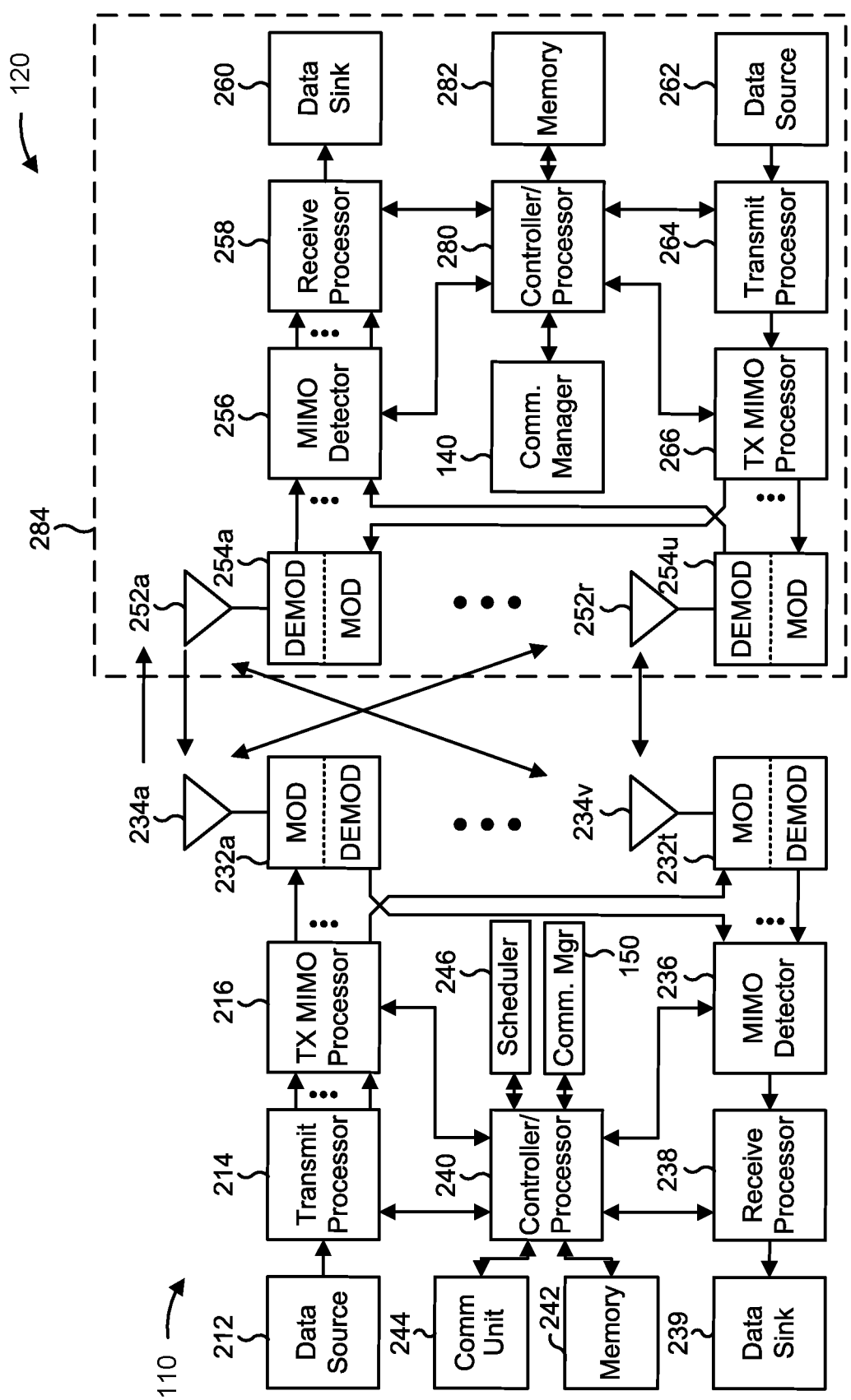
FIG. 2 is a diagram illustrating an example network node in communication with an example user equipment (UE) in a wireless network in accordance with the present disclosure.

FIG. 2 is a diagram illustrating an example network node 110 in communication with an example UE 120 in a wireless network in accordance with the present disclosure.

As shown in FIG. 2, the network node 110 may include a data source 212, a transmit processor 214, a transmit (TX) MIMO processor 216, a set of modems 232 (shown as 232*a* through 232*t*, where t≥1), a set of antennas 234 (shown as 234*a* through 234*v*, where v≥1), a MIMO detector 236, a receive processor 238, a data sink 239, a controller/processor 240, a memory 242, a communication unit 244, a scheduler 246, and/or a communication manager 150, among other examples. In some configurations, one or a combination of the antenna(s) 234, the modem(s) 232, the MIMO detector 236, the receive processor 238, the transmit processor 214, and/or the TX MIMO processor 216 may be included in a transceiver of the network node 110. The transceiver may be under control of and used by one or more processors, such as the controller/processor 240, and in some aspects in conjunction with processor-readable code stored in the memory 242, to perform aspects of the methods, processes, and/or operations described herein. In some aspects, the network node 110 may include one or more interfaces, communication components, and/or other components that facilitate communication with the UE 120 or another network node.

The terms "processor," "controller," or "controller/processor" may refer to one or more controllers and/or one or more processors. For example, reference to "a/the processor," "a/the controller/processor," or the like (in the singular) should be understood to refer to any one or more of the processors described in connection with FIG. 2, such as a single processor or a combination of multiple different processors. Reference to "one or more processors" should be understood to refer to any one or more of the processors described in connection with FIG. 2. For example, one or more processors of the network node 110 may include transmit processor 214, TX MIMO processor 216, MIMO detector 236, receive processor 238, and/or controller/processor 240. Similarly, one or more processors of the UE 120 may include MIMO detector 256, receive processor 258, transmit processor 264, TX MIMO processor 266, and/or controller/processor 280.

In some aspects, a single processor may perform all of the operations described as being performed by the one or more processors. In some aspects, a first set of (one or more) processors of the one or more processors may perform a first operation described as being performed by the one or more processors, and a second set of (one or more) processors of the one or more processors may perform a second operation described as being performed by the one or more processors. The first set of processors and the second set of processors may be the same set of processors or may be different sets of processors. Reference to "one or more memories" should be understood to refer to any one or more memories of a corresponding device, such as the memory described in connection with FIG. 2. For example, operation described as being performed by one or more memories can be performed by the same subset of the one or more memories or different subsets of the one or more memories.

For downlink communication from the network node 110 to the UE 120, the transmit processor 214 may receive data ("downlink data") intended for the UE 120 (or a set of UEs that includes the UE 120) from the data source 212 (such as a data pipeline or a data queue). In some examples, the transmit processor 214 may select one or more modulation and coding schemes (MCSs) for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, semi-static resource partitioning information (SRPI)) and/or control information (for example, CQI requests, grants, and/or upper layer signaling) and provide overhead symbols and/or control symbols. The transmit processor 214 may generate reference symbols for reference signals (for example, a cell-specific reference signal (CRS), a demodulation reference signal (DMRS), or a channel state information (CSI) reference signal (CSI-RS)) and/or synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, and/or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, and/or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, and/or on another downlink channel. A downlink signal may carry one or more transport blocks (TBs) of data. A TB may be a unit of data that is transmitted over an air interface in the wireless communication network 100. A data stream (for example, from the data source 212) may be encoded into multiple TBs for transmission over the air interface. The quantity of TBs used to carry the data associated with a particular data stream may be associated with a TB size common to the multiple TBs. The TB size may be based on or otherwise associated with radio channel conditions of the air interface, the MCS used for encoding the data, the downlink resources allocated for transmitting the data, and/or another parameter. In general, the larger the TB size, the greater the amount of data that can be transmitted in a single transmission, which reduces signaling overhead. However, larger TB sizes may be more prone to transmission and/or reception errors than smaller TB sizes, but such errors may be mitigated by more robust error correction techniques.

For uplink communication from the UE 120 to the network node 110, uplink signals from the UE 120 may be received by an antenna 234, may be processed by a modem 232 (for example, a demodulator component, shown as DEMOD, of a modem 232), may be detected by the MIMO detector 236 (for example, a receive (Rx) MIMO processor) if applicable, and/or may be further processed by the receive processor 238 to obtain decoded data and/or control information. The receive processor 238 may provide the decoded data to a data sink 239 (which may be a data pipeline, a data queue, and/or another type of data sink) and provide the decoded control information to a processor, such as the controller/processor 240.

The network node 110 may use the scheduler 246 to schedule one or more UEs 120 for downlink or uplink communications. In some aspects, the scheduler 246 may use DCI to dynamically schedule DL transmissions to the UE 120 and/or UL transmissions from the UE 120. In some examples, the scheduler 246 may allocate recurring time domain resources and/or frequency domain resources that the UE 120 may use to transmit and/or receive communications using an RRC configuration (for example, a semi-static configuration), for example, to perform semi-persistent scheduling (SPS) or to configure a configured grant (CG) for the UE 120.

One or more of the transmit processor 214, the TX MIMO processor 216, the modem 232, the antenna 234, the MIMO detector 236, the receive processor 238, and/or the controller/processor 240 may be included in an RF chain of the network node 110. An RF chain may include one or more filters, mixers, oscillators, amplifiers, analog-to-digital converters (ADCs), and/or other devices that convert between an analog signal (such as for transmission or reception via an air interface) and a digital signal (such as for processing by one or more processors of the network node 110). In some aspects, the RF chain may be or may be included in a transceiver of the network node 110.

In some examples, the network node 110 may use the communication unit 244 to communicate with a core network and/or with other network nodes. The communication unit 244 may support wired and/or wireless communication protocols and/or connections, such as Ethernet, optical fiber, common public radio interface (CPRI), and/or a wired or wireless backhaul, among other examples. The network node 110 may use the communication unit 244 to transmit and/or receive data associated with the UE 120 or to perform network control signaling, among other examples. The communication unit 244 may include a transceiver and/or an interface, such as a network interface.

The UE 120 may include a set of antennas 252 (shown as antennas 252a through 252r, where r≥1), a set of modems 254 (shown as modems 254a through 254u, where u≥1), a MIMO detector 256, a receive processor 258, a data sink 260, a data source 262, a transmit processor 264, a TX MIMO processor 266, a controller/processor 280, a memory 282, and/or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be under control of and used by one or more processors, such as the controller/processor 280, and in some aspects in conjunction with processor-readable code stored in the memory 282, to perform aspects of the methods, processes, or operations described herein. In some aspects, the UE 120 may include another interface, another communication component, and/or another component that facilitates communication with the network node 110 and/or another UE 120.

For downlink communication from the network node 110 to the UE 120, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, and/or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to the data sink 260 (which may include a data pipeline, a data queue, and/or an application executed on the UE 120), and may provide decoded control information and system information to the controller/processor 280.

For uplink communication from the UE 120 to the network node 110, the transmit processor 264 may receive and process data ("uplink data") from a data source 262 (such as a data pipeline, a data queue, and/or an application executed on the UE 120) and control information from the controller/processor 280. The control information may include one or more parameters, feedback, one or more signal measurements, and/or other types of control information. In some aspects, the receive processor 258 and/or the controller/processor 280 may determine, for a received signal (such as received from the network node 110 or another UE), one or more parameters relating to transmission of the uplink communication. The one or more parameters may include a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, the TPC parameter, and/or another parameter. The control information may facilitate parameter selection and/or scheduling for the UE 120 by the network node 110.

The transmit processor 264 may generate reference symbols for one or more reference signals, such as an uplink DMRS, an uplink sounding reference signal (SRS), and/or another type of reference signal. The symbols from the transmit processor 264 may be precoded by the TX MIMO processor 266, if applicable, and further processed by the set of modems 254 (for example, for DFT-s-OFDM or CP-OFDM). The TX MIMO processor 266 may perform spatial processing (for example, precoding) on the data symbols, the control symbols, the overhead symbols, and/or the reference symbols, if applicable, and may provide a set of output symbol streams (for example, U output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, and/or upconvert) the output sample stream to obtain an uplink signal.

The modems 254a through 254u may transmit a set of uplink signals (for example, R uplink signals or U uplink symbols) via the corresponding set of antennas 252. An uplink signal may include a UCI communication, a MAC-CE communication, an RRC communication, or another type of uplink communication. Uplink signals may be transmitted on a PUSCH, a PUCCH, and/or another type of uplink channel. An uplink signal may carry one or more TBs of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), and/or a physical sidelink feedback channel (PSFCH).

One or more antennas of the set of antennas 252 or the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. As used herein, "antenna" can refer to one or more antennas, one or more antenna panels, one or more antenna groups, one or more sets of antenna elements, or one or more antenna arrays. "Antenna panel" can refer to a group of antennas (such as antenna elements) arranged in an array or panel, which may facilitate beamforming by manipulating parameters of the group of antennas. "Antenna module" may refer to circuitry including one or more antennas, which may also include one or more other components (such as filters, amplifiers, or processors) associated with integrating the antenna module into a wireless communication device.

In some examples, each of the antenna elements of an antenna 234 or an antenna 252 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, and/or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (such as to form a desired beam). For example, given an expected range of wavelengths or frequencies, the spacing may provide a quarter wavelength, a half wavelength, or another fraction of a wavelength of spacing between neighboring antenna elements to allow for the desired constructive and destructive interference patterns of signals transmitted by the separate antenna elements within that expected range.

The amplitudes and/or phases of signals transmitted via antenna elements and/or sub-elements may be modulated and shifted relative to each other (such as by manipulating phase shift, phase offset, and/or amplitude) to generate one or more beams, which is referred to as beamforming. The term "beam" may refer to a directional transmission of a wireless signal toward a receiving device or otherwise in a desired direction. "Beam" may also generally refer to a direction associated with such a directional signal transmission, a set of directional resources associated with the signal transmission (for example, an angle of arrival, a horizontal direction, and/or a vertical direction), and/or a set of parameters that indicate one or more aspects of a directional signal, a direction associated with the signal, and/or a set of directional resources associated with the signal. In some implementations, antenna elements may be individually selected or deselected for directional transmission of a signal (or signals) by controlling amplitudes of one or more corresponding amplifiers and/or phases of the signal(s) to form one or more beams. The shape of a beam (such as the amplitude, peak, beamwidth, presence of side lobes, and/or side lobe levels) and/or the direction of a beam (such as an angle of the beam relative to a surface of an antenna array) can be dynamically controlled by modifying the phase shifts, phase offsets, and/or amplitudes of the multiple signals relative to each other.

Different UEs 120 or network nodes 110 may include different numbers of antenna elements. For example, a UE 120 may include a single antenna element, two antenna elements, four antenna elements, eight antenna elements, or a different number of antenna elements. As another example, a network node 110 may include eight antenna elements, 24 antenna elements, 64 antenna elements, 128 antenna elements, or a different number of antenna elements. Generally, a larger number of antenna elements may provide increased control over parameters for beam generation relative to a smaller number of antenna elements, whereas a smaller number of antenna elements may be less complex to implement and may use less power than a larger number of antenna elements. Multiple antenna elements may support multiple-layer transmissions, in which a first layer of a communication (which may include a first data stream) and a second layer of a communication (which may include a second data stream) are transmitted using the same time and frequency resources with spatial multiplexing.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

Figure 3:
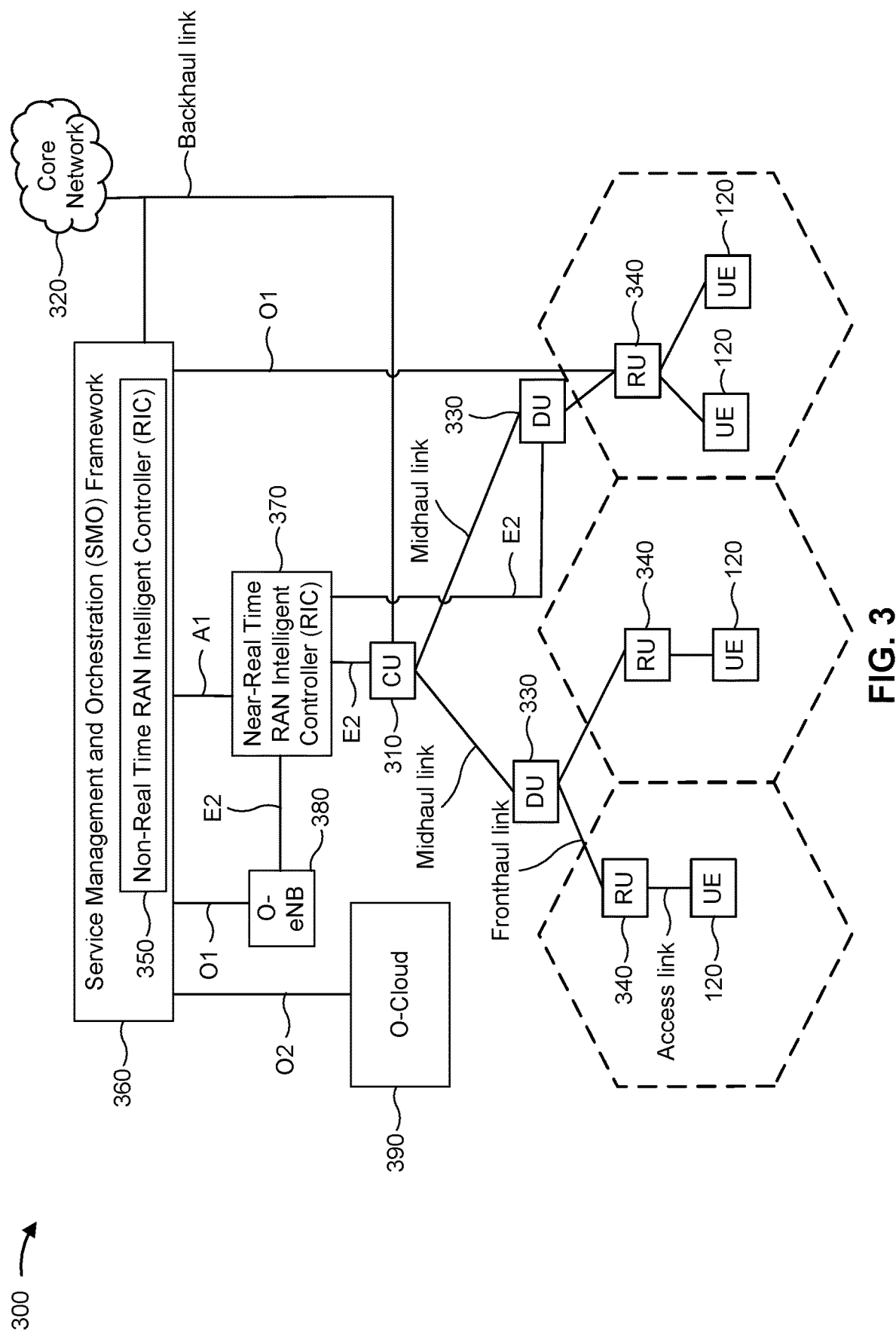
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, may include, or may be included in one or more network nodes (such one or more network nodes 110). The disaggregated base station architecture 300 may include a CU 310 that can communicate directly with a core network 320 via a backhaul link, or that can communicate indirectly with the core network 320 via one or more disaggregated control units, such as a Non-RT RIC 350 associated with a Service Management and Orchestration (SMO) Framework 360 and/or a Near-RT RIC 370 (for example, via an E2 link). The CU 310 may communicate with one or more DUs 330 via respective midhaul links, such as via F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, the Near-RT RICs 370, the Non-RT RICs 350, and the SMO Framework 360, may include one or more interfaces or may be coupled with one or more interfaces for receiving or transmitting signals, such as data or information, via a wired or wireless transmission medium.

In some aspects, the CU 310 may be logically split into one or more CU user plane (CU-UP) units and one or more CU control plane (CU-CP) units. A CU-UP unit may communicate bidirectionally with a CU-CP unit via an interface, such as the E1 interface when implemented in an O-RAN configuration. The CU 310 may be deployed to communicate with one or more DUs 330, as necessary, for network control and signaling. Each DU 330 may correspond to a logical unit that includes one or more base station functions to control the operation of one or more RUs 340. For example, a DU 330 may host various layers, such as an RLC layer, a MAC layer, or one or more PHY layers, such as one or more high PHY layers or one or more low PHY layers. Each layer (which also may be referred to as a module) may be implemented with an interface for communicating signals with other layers (and modules) hosted by the DU 330, or for communicating signals with the control functions hosted by the CU 310. Each RU 340 may implement lower layer functionality. In some aspects, real-time and non-real-time aspects of control and user plane communication with the RU(s) 340 may be controlled by the corresponding DU 330.

The SMO Framework 360 may support RAN deployment and provisioning of non-virtualized and virtualized network elements. For non-virtualized network elements, the SMO Framework 360 may support the deployment of dedicated physical resources for RAN coverage requirements, which may be managed via an operations and maintenance interface, such as an O1 interface. For virtualized network elements, the SMO Framework 360 may interact with a cloud computing platform (such as an open cloud (O-Cloud) platform 390) to perform network element life cycle management (such as to instantiate virtualized network elements) via a cloud computing platform interface, such as an O2 interface. A virtualized network element may include, but is not limited to, a CU 310, a DU 330, an RU 340, a non-RT RIC 350, and/or a Near-RT RIC 370. In some aspects, the SMO Framework 360 may communicate with a hardware aspect of a 4G RAN, a 5G NR RAN, and/or a 6G RAN, such as an open eNB (O-eNB) 380, via an O1 interface. Additionally or alternatively, the SMO Framework 360 may communicate directly with each of one or more RUs 340 via a respective O1 interface. In some deployments, this configuration can enable each DU 330 and the CU 310 to be implemented in a cloud-based RAN architecture, such as a vRAN architecture.

The Non-RT RIC 350 may include or may implement a logical function that enables non-real-time control and optimization of RAN elements and resources, AI/ML workflows including model training and updates, and/or policy-based guidance of applications and/or features in the Near-RT RIC 370. The Non-RT RIC 350 may be coupled to or may communicate with (such as via an A1 interface) the Near-RT RIC 370. The Near-RT RIC 370 may include or may implement a logical function that enables near-real-time control and optimization of RAN elements and resources via data collection and actions via an interface (such as via an E2 interface) connecting one or more CUs 310, one or more DUs 330, and/or an O-eNB with the Near-RT RIC 370.

In some aspects, to generate AI/ML models to be deployed in the Near-RT RIC 370, the Non-RT RIC 350 may receive parameters or external enrichment information from external servers. Such information may be utilized by the Near-RT RIC 370 and may be received at the SMO Framework 360 or the Non-RT RIC 350 from non-network data sources or from network functions. In some examples, the Non-RT RIC 350 or the Near-RT RIC 370 may tune RAN behavior or performance. For example, the Non-RT RIC 350 may monitor long-term trends and patterns for performance and may employ AI/ML models to perform corrective actions via the SMO Framework 360 (such as reconfiguration via an O1 interface) or via creation of RAN management policies (such as A1 interface policies).

As indicated above, FIG. 3 is provided as an example. Other examples may differ from what is described with regard to FIG. 3.

The network node 110, the controller/processor 240 of the network node 110, the UE 120, the controller/processor 280 of the UE 120, the CU 310, the DU 330, the RU 340, or any other component(s) of FIG. 1, 2, or 3 may implement one or more techniques or perform one or more operations associated with a capability indication for a mechanical displacement at a CPE, as described in more detail elsewhere herein. For example, the controller/processor 240 of the network node 110, the controller/processor 280 of the UE 120, any other component(s) of FIG. 2, the CU 310, the DU 330, or the RU 340 may perform or direct operations of, for example, process 700 of FIG. 7, process 800 of FIG. 8, or other processes as described herein (alone or in conjunction with one or more other processors). In some aspects, the CPE described herein is the UE 120, is included in the UE 120, and/or includes one or more components of the UE 120 shown in FIG. 2. The memory 242 may store data and program codes for the network node 110, the network node 110, the CU 310, the DU 330, or the RU 340. The memory 282 may store data and program codes for the UE 120. In some examples, the memory 242 or the memory 282 may include a non-transitory computer-readable medium storing a set of instructions (for example, code or program code) for wireless communication. The memory 242 may include one or more memories, such as a single memory or multiple different memories (of the same type or of different types). The memory 282 may include one or more memories, such as a single memory or multiple different memories (of the same type or of different types). For example, the set of instructions, when executed (for example, directly, or after compiling, converting, or interpreting) by one or more processors of the network node 110, the UE 120, the CU 310, the DU 330, or the RU 340, may cause the one or more processors to perform process 700 of FIG. 7, process 800 of FIG. 8, or other processes as described herein. In some examples, executing instructions may include running the instructions, converting the instructions, compiling the instructions, and/or interpreting the instructions, among other examples.

In some aspects, a CPE (e.g., a UE 120 and/or an apparatus 900) includes means for transmitting a capability message that includes an indication of a mechanical displacement capability at the CPE; and/or means for receiving an instruction to perform a radio optimization procedure that is based at least in part on the mechanical displacement capability, the radio optimization procedure comprising at least one of: an RLM procedure, an RRM procedure, or a beam management procedure. In some aspects, the means for the CPE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110 and/or an apparatus 1000) includes means for receiving a capability message that includes an indication of a mechanical displacement capability at a CPE; and/or means for transmitting an instruction to perform a radio optimization procedure that is based at least in part on the mechanical displacement capability, the radio optimization procedure comprising at least one of: an RLM procedure, an RRM procedure, or a beam management procedure. The means for the network node to perform operations described herein may include, for example, one or more of communication manager 150, transmit processor 214, TX MIMO processor 216, modem 232, antenna 234, MIMO detector 236, receive processor 238, controller/processor 240, memory 242, or scheduler 246.

As indicated above, FIG. 3 is provided as an example. Other examples may differ from what is described with regard to FIG. 3.

Figure 4A:
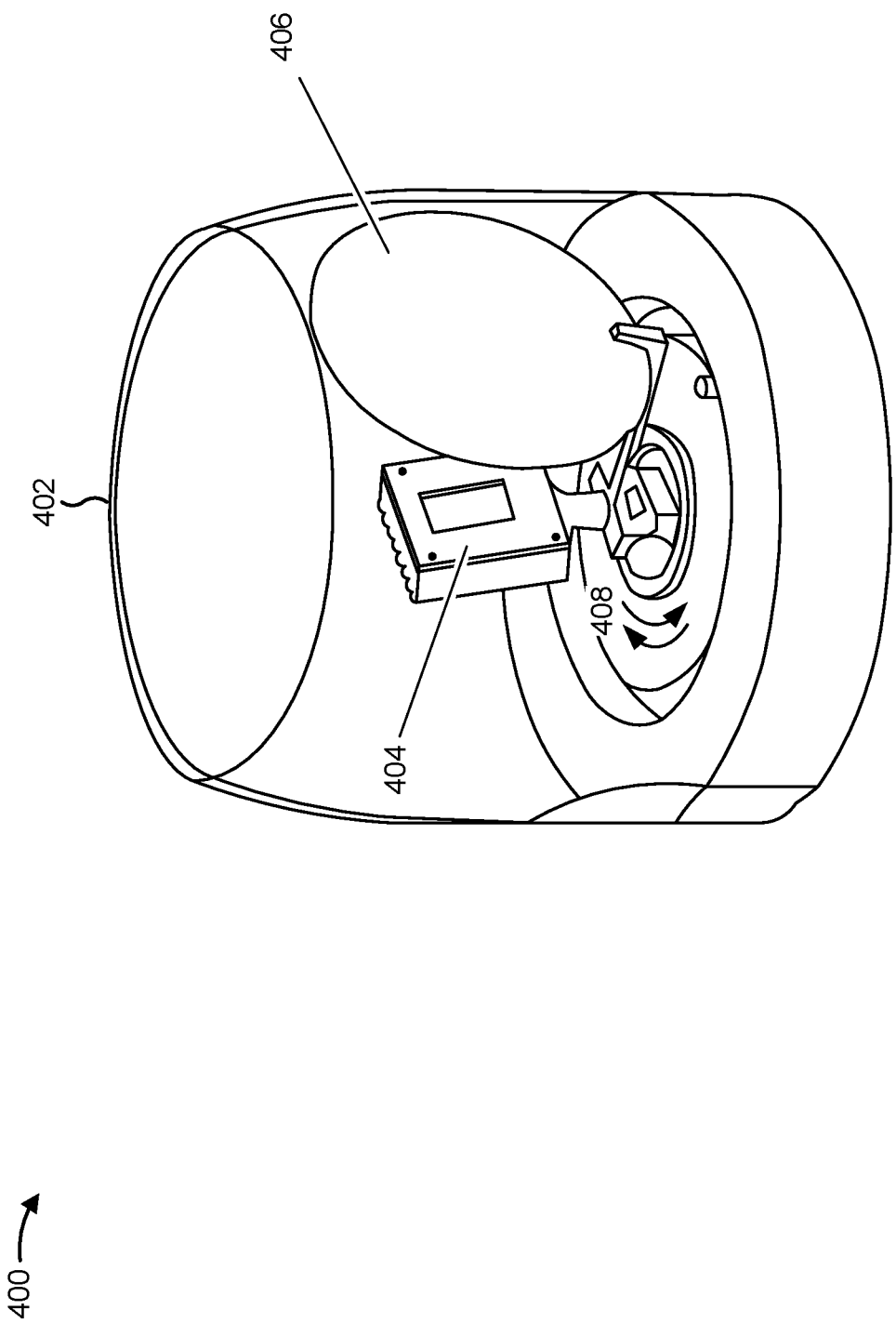
FIGS. 4A and 4B are diagrams illustrating a first example and a second example, respectively, of mechanical displacement that may be performed by a customer premises equipment (CPE), in accordance with the present disclosure.
Figure 4B:
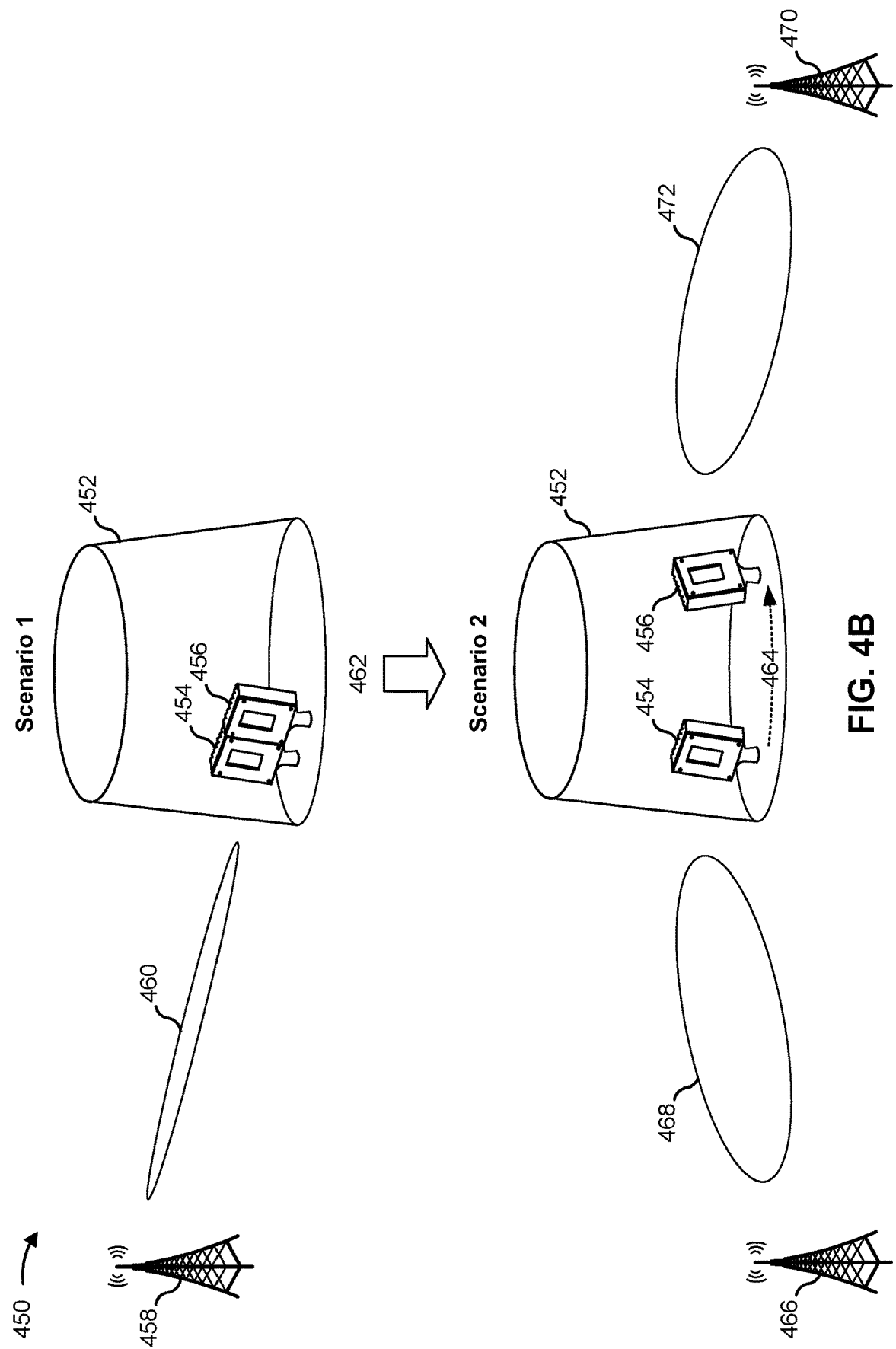

FIGS. 4A and 4B are diagrams illustrating a first example 400 and a second example 450, respectively, of mechanical displacement that may be performed by a CPE, in accordance with the present disclosure.

As described above, a UE 120 may be implemented as a CPE that acts as an intermediary device and/or an interface device between a service provider network (e.g., via a network node 110) and another UE (e.g., a mobile phone, a tablet, a desktop computer, a smart watch, and/or an IoT). Some example CPEs may include a modem, a router, a switch, a repeater, and/or an adapter.

The evolution of CPEs may include a progression from a first CPE using a large antenna array (e.g., an 8×8 antenna array, a 16×8 antenna array, and/or a 16×16 antenna array) to a second CPE using a small antenna array (e.g., a 4×4 antenna array, a 2×1 antenna array, and/or a 2×2 antenna array). In some aspects, the progression from using a large antenna array to a small antenna array may reduce an implementation cost of the CPE. "Large antenna array" and "small antenna array" may denote relative comparisons between antenna arrays that are based at least in part on a respective number of antenna elements included in each antenna array and/or a respective physical size of each antenna array. Accordingly, a large antenna array may include more antenna elements and/or may have a larger physical size relative to a small antenna array. In some aspects, a CPE that uses a small antenna array may also include a reflector and/or a mechanical rotator to increase an array gain and/or an equivalent isotropic radiated power (EIRP) of the small antenna array. To illustrate, and as shown by FIG. 4A, a CPE 402 includes an antenna panel 404 and a reflector 406, and the antenna panel 404 may include an antenna array, such as a small antenna array as described above. In some aspects, the reflector 406 may increase an effective aperture size of the antenna array by focusing a wireless signal transmitted and/or received by the antenna array in a manner that concentrates the energy and/or signal power of the wireless signal. One such example of a reflector includes a Cassegrain reflector that uses a primary concave mirror and a secondary convex mirror to focus a wireless signal.

As shown by reference number 408, the CPE 402 may also include a mechanical displacement capability to rotate and/or reposition the antenna panel 404 and/or the reflector 406. For instance, the CPE 402 may rotate the antenna panel 404 and/or the reflector 406 to improve a signal quality (e.g., increase a received power level), such as by rotating the antenna panel 404 and/or the reflector 406 to a location that is within a line-of-sight (LoS) of a device that communicates with the CPE 402 using wireless signals, such as a network node 110 and/or a CPE (e.g., a UE 120). In some aspects, the CPE 402 may iteratively rotate and/or move components (e.g., the antenna panel and/or the reflector) based at least in part on the CPE changing locations. The use of the antenna panel 404 in combination with the reflector 406 may reduce power consumption and/or a thermal overhead of the CPE 402 relative to another CPE that uses a large antenna array, at least through the use of fewer antenna elements.

The second example 450 shown by FIG. 4B includes a CPE 452 that is configured with a mechanical displacement capability to move and/or rotate an antenna panel. The CPE 452 includes a first antenna panel 454 and a second antenna panel 456, and each antenna panel may include a respective antenna array. In Scenario 1, the first antenna panel 454 and the second antenna panel 456 are co-located. "Co-located" may denote that the first antenna panel 454 and the second antenna panel 456 are at commensurate locations (e.g., locations that are within a threshold distance of one another). In some aspects, the CPE 452 may use co-located antenna panels jointly to communicate with another device, such as a network node 458, as shown by FIG. 4A, and/or a UE 120. "Jointly" may denote the CPE 452 using the antenna elements included in the first antenna panel 454 and the antenna elements included in the second antenna panel 456 together to transmit and/or receive communications with a single network node (e.g., a same network node). To illustrate, the first antenna panel 454 and the second antenna panel 456 may operate jointly in a manner that combines the respective antenna elements of each antenna panel to form a combined antenna array, and the combined antenna array may include more antenna elements relative to the antenna elements included in a first antenna array in the first antenna panel 454 operating separately from the antenna elements included in a second antenna array in the second antenna panel 456. That is, the combined antenna array may utilize all of the antenna elements in the first antenna panel 454 and all of the antenna elements in the second antenna panel 456 together and in a coordinated manner. For example, the combined antenna array may be configured to communicate with the network node 458 by forming a beam 460 that has a spatial beamwidth that the first antenna panel 454 and/or the second antenna panel 456 may be unable to achieve when operating separately from one another. In some aspects, the beam 460 may be classified as a narrow beam and/or beam that has a beamwidth that satisfies a narrow beamwidth threshold. Using a combined antenna array may enable the CPE 452 to achieve a narrower beamwidth for the beam 460 than may be achievable by only using the antenna elements in a single antenna panel (e.g., the first antenna panel 454 or the second antenna panel 456).

As another example, the combined antenna array may be configured to transmit two (2) layers of data and/or four (4) layers of data, such as by using polarization MIMO and/or two spatial beams. For instance, the CPE 452 may communicate with the network node 458 via the combined antenna array (e.g., jointly using the first antenna panel 454 and the second antenna panel 456) using 2-layer transmissions and narrow beamwidth beams. Alternatively, or additionally, the CPE 452 may communicate with the network node 458 using a 4-layer transmission, such as by using a first 2-layer transmission that is transmitted and/or received by the first antenna panel 454 and a second 2-layer transmission that is transmitted and/or received by the second antenna panel 456. Beams that are used to transmit and/or receive the 4-layer transmission (e.g., via the first 2-layer transmission and the second 2-layer transmission) may be configured as wide beamwidth beams (e.g., beams that have a beamwidth that satisfies a wide beamwidth threshold) based at least in part on each respective 2-layer transmission of the 4-layer transmission being directed to a different antenna panel and/or a respective number of antenna elements in the respective antenna panel.

In some aspects, the network node 458 and/or the CPE 452 may determine to use the 2-layer narrow beamwidth transmission and/or the 4-layer wide beamwidth transmission based at least in part on an interference level in a communication channel and/or a spatial correlation between the first antenna panel 454 and the second antenna panel 456. To illustrate, the network node 458 may determine to use the 2-layer narrow beamwidth transmission based at least in part on the interference level satisfying a high interference threshold and to avoid spatial overlap in areas that include interference. Alternatively, or additionally, the network node 458 may determine to use the 4-layer wide beamwidth transmission based at least in part on the spatial correlation between the first antenna panel 454 and the second antenna panel 456 satisfying a high correlation threshold that indicates an inability to precisely steer a narrow beamwidth beam.

As shown by reference number 462, the CPE 452 may modify a physical and/or mechanical configuration of the first antenna panel 454 and/or the second antenna panel 456. In Scenario 2, the CPE 452 may mechanically displace and/or rotate the second antenna panel 456 to a different location than the first antenna panel, as shown by reference number 464. For example, the CPE 452 may include a mechanical displacement capability (e.g., a motor) that moves and/or rotates the second antenna panel 456 to a non-co-located position (e.g., outside of the distance threshold) with the first antenna panel 454. As shown by FIG. 4B, moving the second antenna panel 456 to a non-co-located position may result in the first antenna panel 454 pointing in a different LoS direction and/or boresight direction relative to the second antenna panel 456. The ability to position the antenna panels into different LoS directions may enable the CPE 452 to establish communication links with different network nodes and/or different UEs. To illustrate, and as shown by FIG. 4B, the first antenna panel 454 may be used to communicate with a first network node 466 using a first beam 468, and the second antenna panel 456 may be used to communicate with a second network node 470 using a second beam 472. Using the first antenna panel 454 separately from the second antenna panel 456 (e.g., not in a joint manner) may result in the CPE 452 communicating through the use of wide beamwidth beams that have a beamwidth that satisfies a wide beamwidth threshold. That is, the first beam 468 and the second beam 472 may have a wider beamwidth relative to the beam 460 based at least in part on a respective number of antenna elements used to transmit and/or receive the first beam 468, the second beam 472, and the beam 460.

As shown by FIG. 4B, the first beam 468 may be configured with a different boresight direction than the second beam 472, based at least in part on a respective location of each antenna panel and/or network node. Accordingly, the mechanical displacement capability of the CPE 452 (e.g., the motor and/or rotation capability) allows the CPE 452 to configure and/or position the first antenna panel 454 and the second antenna panel 456 to point in different directions to communicate with different devices, such as multiple network nodes, a network node and a UE 120, and/or multiple UEs via different communication links. In some aspects, the first network node 466 and the second network node 470 may be independent from one another, and in other aspects, the first network node 466 and the second network node 470 may operate as a coordinated system (e.g., inter-connected network nodes that may share a common communication channel).

A CPE that includes a mechanical displacement capability, such as a motor that rotates an antenna panel, moves or displaces the antenna panel, rotates a reflector, and/or moves the reflector may improve a signal quality in some operating environments. For example, moving an antenna panel to a location that positions the antenna panel within LoS of a CPE and/or a network node may increase a received power level of a signal at the CPE. As another example, rotating a reflector may increase a concentration and/or energy of a wireless signal reflected by the reflector. In some aspects, the mechanical displacement capability may displace an antenna panel and/or a reflector by a known amount, such as a fixed distance, a fixed rotation angle, a quantized distance, a quantized rotation angle, a bounded distance (e.g., a distance no greater than a distance threshold), and/or a bounded rotation angle (e.g., a rotation angle no greater than a rotation angle threshold). Alternatively, or additionally, the mechanical displacement may be a linear mechanical displacement (e.g., along an X-axis and/or along a Y-axis) and/or an angular mechanical displacement (e.g., around an axis).

While mechanical displacement of an antenna panel and/or a reflector may improve a signal quality (e.g., a signal strength), the movement from a first position to a second position may take a significant amount of time in the context of wireless communications. For instance, the movement from the first position to the second position may take a duration that spans a few seconds to a few tens of seconds, while wireless communications may have timing conditions that are characterized in microseconds and/or milliseconds. During the mechanical displacement, a CPE may be non-functional and/or unavailable to support transmissions with another device. For example, the CPE may be non-functional and/or unavailable for the few seconds and/or tens of seconds that are associated with a mechanical displacement. The duration of the mechanical displacement and the unavailability of the CPE during the mechanical displacement, may adversely affect a radio optimization procedure, such as an RRM procedure, an RLM procedure, and/or a beam management procedure. "Radio optimization procedure" may denote a procedure performed by a network node 110 and/or a UE 120 that may provide information about a communication channel that may be used by a device (e.g., a network node 110 and/or a UE 120) to select a communication configuration that improves communications (e.g., increases a signal quality, reduces recovery errors, increases a data throughput, and/or reduces air interface resource usages) relative to other communication configurations, such as a communication configuration that includes any combination of a particular beam, a particular air interface resource, a particular carrier frequency, a particular MCS, and/or a particular time slot. Alternatively, or additionally, the information may be used to determine a state of a communication link (e.g., operational or non-operational).

To illustrate, a communications standard (e.g., the 3GPP level) may specify an operating condition for a radio optimization procedure, such as a timing condition for a CPE to calculate one or more inter-frequency cell measurements within a time period and/or with a periodicity. Alternatively, or additionally, the timing condition may include the UE evaluating the inter-frequency cell measurement(s) within the time period and/or periodicity to determine whether a particular inter-frequency cell measurement satisfies reselection criteria. In some aspects, as part of performing the radio optimization procedure, the CPE may generate a measurement metric during a time span in which the CPE is performing a mechanical displacement and is non-functional. Accordingly, the CPE may generate an erroneous measurement metric that is used to select a communication configuration and/or is used to determine a state of a communication link, resulting in sub-optimal selections by, and/or failure of, a radio optimization procedure and, consequently, disruptions to communications at the UE. For example, sub-optimal selections by, and/or failure of, the radio optimization procedure may result in any combination of a handover failure, unreliable network service, and/or battery drain at the UE.

Some techniques and apparatuses described herein provide a capability indication for a mechanical displacement at a CPE. In some aspects, the CPE may transmit a capability message that indicates a mechanical displacement capability at the CPE. To illustrate, the CPE may transmit a capability message that indicates any combination of a repositioning duration, a repositioning rate, and/or a displacement range. Based at least in part on transmitting the capability message that indicates the mechanical displacement capability, the CPE may receive an instruction to perform a radio optimization procedure that is based at least in part on the mechanical displacement capability. Some examples of a radio optimization procedure may include an RLM procedure, an RRM procedure, and/or a beam management procedure, and the radio optimization procedure may be based at least in part on a time span and/or periodicity that is configured to accommodate the mechanical displacement. For instance, the CPE may receive an instruction (e.g., that is directed to a UE serviced by the CPE and/or is directed to the CPE) to perform one or more measurements (e.g., inter-cell measurements and/or beam management measurements) as part of the radio optimization procedure and using the time span and/or periodicity that is configured to accommodate the mechanical displacement, such as a time span and/or periodicity that mitigates a measurement metric being generated during the mechanical displacement.

In some aspects, a network node may receive a capability message that indicates a mechanical displacement capability at a CPE. Based at least in part on receiving the capability message that indicates the mechanical displacement capability, the network node may transmit an instruction to perform a radio optimization procedure that is based at least in part on the mechanical displacement capability, such as an instruction to perform any combination of an RLM procedure, an RRM procedure, and/or a beam management procedure using the time span and/or periodicity that is configured to accommodate the mechanical displacement.

A CPE indicating a mechanical displacement capability may enable a network node, or other devices (e.g., a UE 120 and/or a CPE), to configure a radio optimization procedure using a time span and/or a periodicity that accommodates the mechanical displacement and/or mitigates erroneous measurement metrics that are generated during the mechanical displacement. Alternatively, or additionally, the network node may configure the radio optimization procedure to generate information about different mechanical positions, as described below. For instance, the network node may configure the radio optimization procedure to use a time span and/or a periodicity that has been adjusted and/or modified to mitigate a measurement being calculated during a time span in which the CPE is non-functional. Alternatively, or additionally, the network node may configure the radio optimization procedure to use a respective set of reference signals (RSs) and/or to generate a respective measurement metric for each respective mechanical position. Mitigating the generation of a measurement during a time span in which the CPE is non-functioning, and/or obtaining information about mechanical positions supported by a CPE, may mitigate a sub-optimal selection by, and/or failure of, a radio optimization procedure that may result in any combination of a handover failure, unreliable network service, and/or battery drain at the UE.

As indicated above, FIGS. 4A and 4B are provided as examples. Other examples may differ from what is described with regard to FIGS. 4A and 4B.

Figure 5:
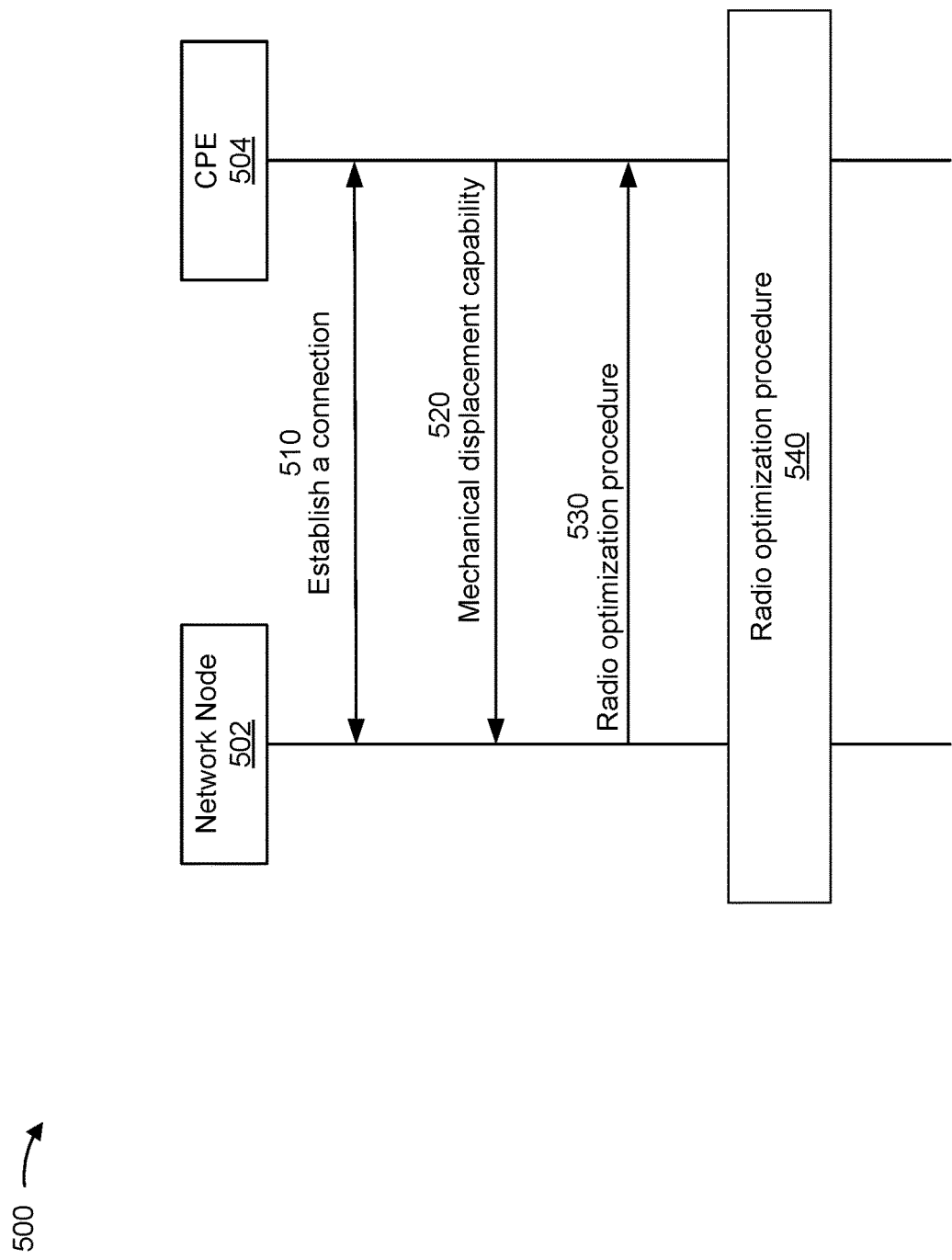
FIG. 5 is a diagram illustrating an example of a wireless communication process between a network node, a CPE, and a UE, in accordance with the present disclosure.

FIG. 5 is a diagram illustrating an example 500 of a wireless communication process between a network node 502 (e.g., the network node 110) and a CPE 504 (e.g., a first UE 120), in accordance with the present disclosure.

As shown by reference number 510, a network node 502 and a CPE 504 may establish a connection. To illustrate, the CPE 504 and the network node 502 may perform one or more procedures (e.g., a random access channel (RACH) procedure and/or an RRC procedure) to establish a wireless connection. In some aspects, the network node 502 and the CPE 504 may communicate via the connection based at least in part on any combination of Layer 1 signaling (e.g., DCI and/or UCI), Layer 2 signaling (e.g., a MAC control element (CE)), and/or Layer 3 signaling (e.g., RRC signaling). For instance, the network node 502 may request, via RRC signaling, UE capability information, and/or the CPE 504 may transmit, via RRC signaling, the UE capability information. As part of communicating via the connection, the network node 502 may transmit configuration information via Layer 3 signaling (e.g., RRC signaling), and activate and/or deactivate a particular configuration via Layer 2 signaling (e.g., a MAC CE) and/or Layer 1 signaling (e.g., DCI). To illustrate, the network node 502 may transmit the configuration information via Layer 3 signaling at a first point in time associated with the CPE 504 being tolerant of communication delays, and the network node 502 may transmit an activation of the configuration via Layer 2 signaling and/or Layer 1 signaling at a second point in time associated with the CPE 504 being intolerant to communication delays.

As shown by reference number 520, the CPE 504 may transmit, and the network node 502 may receive, an indication of a mechanical displacement capability of the CPE 504. As one example, the CPE 504 may transmit a capability message that indicates the mechanical displacement capability. For clarity, FIG. 5 shows the CPE 504 signaling the indication of the mechanical displacement capability (e.g., via a capability message) separately from establishing a connection with the network node 502. However, in some aspects, the CPE 504 may signal the indication of the mechanical displacement capability as part of establishing the connection with the network node 502. The capability message may indicate, as the mechanical displacement capability, a supported mechanical displacement capability type, such as an ability to move and/or rotate an antenna panel, and/or a parameter of the displacement capability, such as a duration and/or range, as described below.

In some aspects, the CPE 504 may indicate, as the mechanical displacement capability, any combination of an angular mechanical displacement (e.g., a rotation angular mechanical displacement and/or a reflection angular mechanical displacement) and/or a linear mechanical displacement. Alternatively, or additionally, the CPE 504 may indicate, as the mechanical displacement capability, an antenna panel mechanical displacement and/or a reflector mechanical displacement, such as the mechanical displacement capabilities described with regard to FIGS. 4A and 4B. The CPE 504 may indicate an ability to mechanically displace multiple antenna panels, multiple reflectors, and/or multiple mechanical displacement options for a particular component (e.g., an angular rotation of an antenna panel and a linear movement of the antenna panel).

As described above, the CPE 504 may indicate, as the mechanical displacement capability, one or more parameters that characterize a supported mechanical displacement, such as a repositioning duration (e.g., an amount of time used and/or how long the CPE 504 takes to perform repositioning), a repositioning rate (e.g., a periodicity of, a frequency of, and/or how often the CPE 504 supports repositioning), and/or a displacement range (e.g., a distance range of displacement and/or an angle range of displacement). In some aspects, the CPE 504 may indicate a statistical value for a parameter, such as an average value (e.g., an average time-based repositioning rate, an average frequency-based repositioning rate, and/or an average displacement range), a median value, a variance value, and/or a percentile value.

The CPE 504 may indicate the mechanical displacement capability using any combination of Layer 1 signaling, Layer 2 signaling, and/or Layer 3 signaling. As one example, the CPE 504 may signal (e.g., in the Layer 1 signaling, the Layer 2 signaling, and/or the Layer 3 signaling) a bitfield, and each bit of the bitfield may map to a respective setting or a respective value. To illustrate, each bit of the bitfield may map to a respective quantized value of a range of values, such as quantized repositioning duration values, quantized repositioning rate values, and/or quantized displacement range values, and the CPE 504 may set a particular bit to a value (e.g., "1") that indicates a mechanical displacement capability supported by the CPE 504. For instance, the CPE 504 may set a third least significant bit (LSB) to the value to indicate a repositioning duration of five (5) seconds, or a fourth LSB to indicate a repositioning duration of 10 seconds. Alternatively, or additionally, the CPE 504 may indicate the mechanical displacement capability by indicating a particular mechanical displacement capability power class. In some aspects, a mechanical displacement capability power class is a power class that characterizes a physical (PHY) layer capability associated with the mechanical displacement capability.

As shown by reference number 530, the network node 502 may transmit, and the CPE 504 may receive, an instruction to perform a radio optimization procedure based at least in part on the mechanical displacement capability. Examples of a radio optimization procedure may include an RRM procedure, an RLM procedure, and/or a beam management procedure.

In some aspects, the network node 502 may transmit, and the CPE 504 may receive, configuration information for the radio optimization procedure, such as configuration information for a beam management procedure, and the configuration information may be based at least in part on the mechanical displacement capability indicated by the CPE 504. To illustrate, the CPE 504 may indicate, as at least part of the mechanical displacement capabilities, support for a number of mechanical positions (e.g., multiple mechanical positions for an antenna panel and/or a reflector), and the network node 502 may schedule air interface resources used for the beam management procedure based at least in part on the number of mechanical positions supported by the CPE 504. To illustrate, the network node 502 may schedule and/or configure a respective set of air interface resources for each mechanical position of the mechanical positions, such as a respective set of air interface resources for a respective beam transmission for each mechanical position of the multiple mechanical positions and/or a respective RS transmission for each mechanical position of the multiple mechanical positions. Examples of RSs may include a respective channel state information reference signal (CSI-RS) and/or a respective sounding reference signal (SRS). In some aspects, the number of sets of air interface resource scheduled by the network node 502 may be proportional to the number of mechanical positions supported by the CPE 504. That is, the network node 502 may schedule more sets of air interface resources and/or more RSs for a first CPE that supports more mechanical positions (e.g., 20) relative to a second CPE that supports fewer mechanical positions (e.g., five (5)).

As shown by reference number 540, the network node 502 and the CPE 504 may perform a radio optimization procedure. As one example, the network node 502 and the CPE 504 may perform a beam management procedure that is used (e.g., by the network node 502 and/or the CPE 504) to select a beam and/or an antenna panel position for a communication link between the network node 502 and the CPE 504. In some aspects, the CPE 504 may include a mechanical displacement capability that includes moving and/or rotating an antenna panel and/or a reflector to multiple mechanical positions, and the beam management procedure may include the CPE 504 using the multiple mechanical positions of the antenna panel and/or reflector. As another example, the network node 502 and the CPE 504 may perform an RRM procedure and/or an RLM procedure to maintain the communication link between the network node 110 and the CPE 504, and the RRM and/or RLM procedure may be based at least in part on a timing condition that is based at least in part on the mechanical displacement capability, as described below.

The radio optimization procedure may include the CPE 504 computing an inter-cell measurement metric using a timing condition that is based at least in part on the mechanical displacement capability. For example, the timing condition may be specified by a communication standard, and the communication standard may define different timing conditions for different capabilities (e.g., including a mechanical displacement capability or not including a mechanical displacement capability). For instance, and as described with regard to FIG. 6, the communication standard may specify a first set of parameters to use for determining a timing condition for devices that do not include a mechanical displacement capability and a second set of parameters to use for determining a timing condition for devices that include a mechanical displacement capability. As one example, the timing condition may be associated with performing inter-cell measurements as part of an RLM procedure, and the communication standard may increase a duration of the timing condition for performing the inter-cell measurement when a device that includes a mechanical displacement capability is used in a communication link.

To illustrate, a first timing condition specified by the communication standard for a first device that includes a mechanical displacement capability (and/or uses a device that includes the mechanical displacement capability) may have a longer duration relative to a second timing condition specified by the communication standard for a second device that does not include the mechanical displacement capability (and/or does not use a device that includes the mechanical displacement capability) as described with regard to FIG. 6. For instance, the first timing condition may be based at least in part on a repositioning duration that the CPE 504 supports for moving and/or rotating a component (e.g., an antenna panel and/or a reflector). Accordingly, the CPE 504 may perform the beam management procedure using a timing condition that is based at least in part on the mechanical displacement capability and/or mitigates the generation of a measurement metric during the repositioning duration. In some aspects, the first timing condition may be relaxed (e.g., a duration is increased and/or a periodicity is extended) relative to the second timing condition, and the increased duration and/or extended periodicity may be based at least in part on accounting for, and/or including, a latency at a device (e.g., a CPE) that includes a mechanical displacement capability.

A CPE indicating a mechanical displacement capability may enable a network node to configure a radio optimization procedure using a time span and/or a periodicity that accommodates the mechanical displacement. That is, the network node may configure the radio optimization procedure to use a time span and/or a periodicity that has been adjusted and/or modified to mitigate a measurement being calculated during a time span in which the CPE is non-functioning. Mitigating the generation of a measurement during a time span in which the CPE is non-functioning may mitigate a sub-optimal selection by, and/or failure of, a radio optimization procedure and consequences of the sub-optimal selection, and/or failure, such as a handover failure, unreliable network service, and/or battery drain at the UE.

As indicated above, FIG. 5 is provided as an example. Other examples may differ from what is described with regard to FIG. 5.

Figure 6A:

FIGS. 6A and 6B are diagrams illustrating a first example 600 and a second example 650, respectively, of timing conditions for performing a radio optimization procedure, in accordance with the present disclosure.

The first example 600 shown by FIG. 6A includes a first table 602 that indicates example values for various timing conditions used by a UE (e.g., a UE 120 and/or a CPE) to perform an inter-frequency cell measurement in a first scenario that does not include a mechanical displacement capability, such as a mechanical displacement capability as described with regard to FIGS. 4A and 4B. That is, for the first scenario, a UE that uses a mechanical displacement capability is not included in a transmission and/or reception path (e.g., the UE is not included as an intermediate device, a transmitting device, and/or a receiving device) of a signal being measured via the inter-frequency cell measurement.

As shown by FIG. 6A, the first table 602 may specify values for the different timing conditions based at least in part on different UE configurations (e.g., FR2-1 power class 1, FR2-1 power class 2, FR2-1 power class 3, FR2-1 power class 4, FR2-1 power class 5, FR2-2 power class 1, FR2-2 power class 2, and/or FR2-2 power class 3) and/or different frequency configurations of the signal being measured (e.g., an FR1 frequency and/or an FR2 frequency). For instance, the values specified by the first table 602 include different values for an FR2 frequency band that are based at least in part on a power class configuration of a UE. To illustrate, a first UE that is classified by an FR2-1 power class 2 may use a first value for a timing condition that is different from a second value for the timing condition that is used by a second UE that is classified by an FR2-2 power class.

The values for the timing conditions specified by the first table 602 may be based at least in part on a discontinuous reception (DRX) cycle of the UE. For instance, the timing conditions may include a first timing condition (shown as $T_{detect, NR\_Inter}$ by FIG. 6A) for a UE to evaluate whether a newly detectable inter-frequency cell meets reselection criteria, a second timing condition (shown as $T_{measure, NR\_Inter}$ by FIG. 6A) for at least how often a UE generates an inter-frequency cell measurement for a higher priority cell (e.g., with a priority indicated by a network node and/or determined by the UE), and a third timing condition (shown as $T_{evaluate, NR\_Inter}$ by FIG. 6A) for a UE to evaluate whether an already detected, but not selected, inter-frequency cell meets reselection criteria. As shown by FIG. 6A, values for each timing condition may be specified, at least in part, in terms of a DRX cycle length and a scaling factor such that a first UE that is configured with a first DRX cycle (e.g., 0.32 seconds) may use different values for the first timing condition, the second timing condition, and/or the third timing condition relative to a second UE that is configured with a second DR cycle length (e.g., 2.56 seconds).

The second example 650 shown by FIG. 6B includes a second table 652 that indicates example values for timing conditions that may be used by a UE (e.g., a UE 120 and/or a CPE) to perform an inter-frequency cell measurement in a second scenario that includes a mechanical displacement capability, such as a mechanical displacement capability as described with regard to FIGS. 4A and 4B.

As shown by FIG. 6B, the second table 652 specifies the same timing conditions as the first table 600 (e.g., the first timing condition (e.g., $T_{detect, NR\_Inter}$), the second timing condition (e.g., $T_{measure, NR\_Inter}$), and the third timing condition (e.g., $T_{evaluate, NR\_Inter}$), and values for the timing conditions may differ based at least in part on different UE configurations and/or different frequency configurations of the signal being measured. For example, the second table 652 includes two FR1-1 scaling factors: FR1-1 and FR1-2. As indicated by Note 3: the FR1-1 scaling factor (e.g., N1=1) may be used by a first UE that does not support an FR1 mechanical displacement capability power class to calculate one or more of the timing conditions, such as $T_{measure,\ NR\_Inter}$. As indicated by Note 4, the FR1-2 scaling factor (e.g., N1=5) may be used by a second UE supports an FR1 mechanical displacement capability power class to calculate one or more of the timing conditions, such as $T_{measure,\ NR\_Inter}$. In the example 650, the FR1-2 scaling factor is larger than the FR1-1 scaling factor, resulting in an increased duration for a timing condition. To illustrate, and for a DRX cycle=0.32 seconds, $T_{measure,\ NR\_Inter}$=1.92 seconds (6 DRX cycles) using the FR1-1 scaling factor of 1, and $T_{measure,\ NR\_Inter}$=9.6 seconds (30 DRX cycles) using the FR1-2 scaling factor of 5. The increased duration and/or scaling factor may be configured to include a latency, such as a repositioning duration, to mitigate a UE generating measurement metrics during a mechanical displacement. While FIG. 6B illustrates the FR1-2 scaling factor as being value of 5, other examples may use a different value for the scaling factor and/or may increase a duration for a timing conditions (e.g., for UEs that support a mechanical displacement capability power class) in a different manner.

As indicated above, FIGS. 6A and 6B are provided as examples. Other examples may differ from what is described with regard to FIGS. 6A and 6B.

Figure 7:
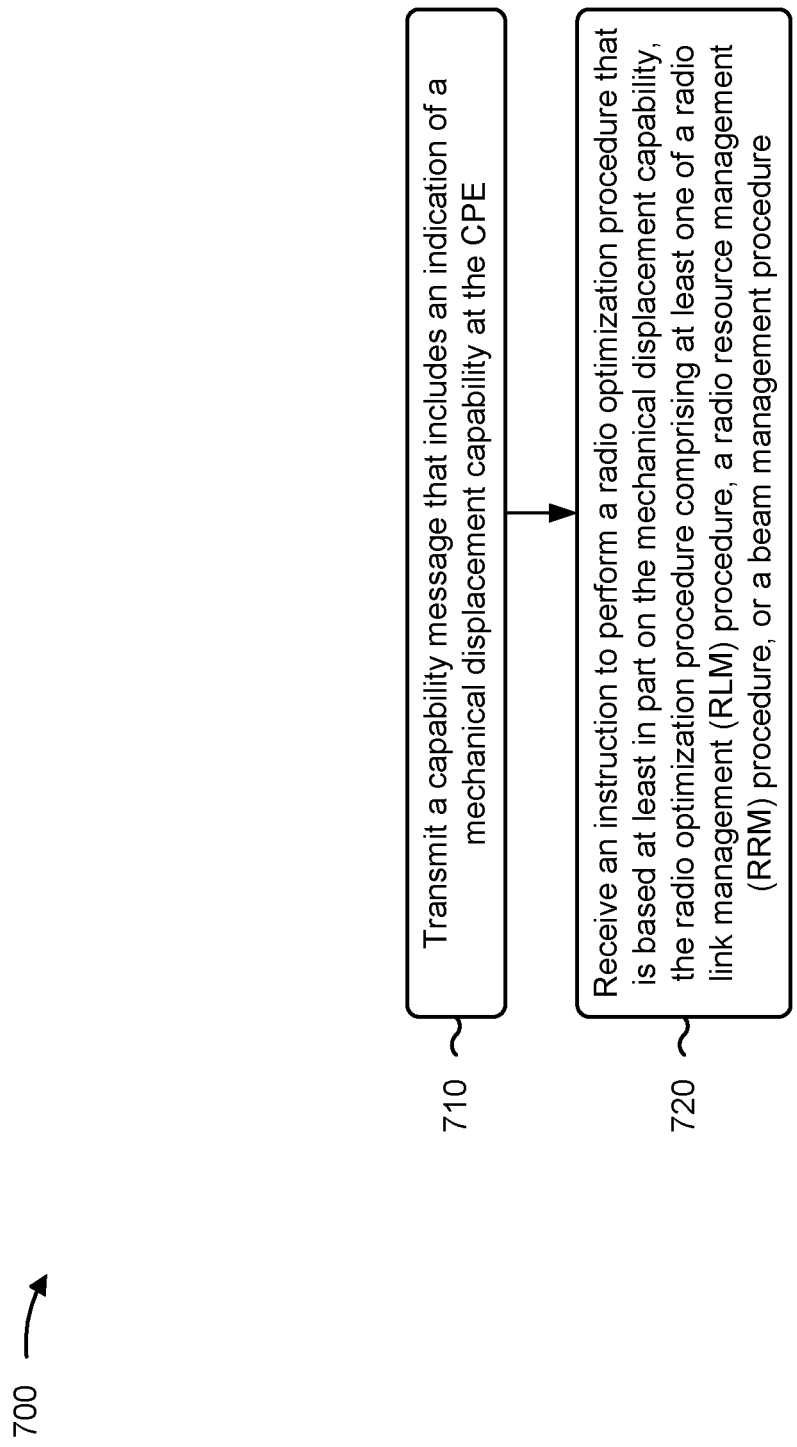
FIG. 7 is a diagram illustrating an example process performed, for example, at a CPE or an apparatus of a CPE, in accordance with the present disclosure.

FIG. 7 is a diagram illustrating an example process 700 performed, for example, at a CPE or an apparatus of a CPE, in accordance with the present disclosure. Example process 700 is an example where the apparatus or the CPE (e.g., a UE 120, a CPE 402, a CPE 452, and/or a CPE 504) performs operations associated with capability indication for a mechanical displacement at the CPE.

As shown in FIG. 7, in some aspects, process 700 may include transmitting a capability message that includes an indication of a mechanical displacement capability at the CPE (block 710). For example, the CPE (e.g., using transmission component 904 and/or communication manager 906, depicted in FIG. 9) may transmit a capability message that includes an indication of a mechanical displacement capability at the CPE, as described above (e.g., as described in connection with FIG. 5).

As further shown in FIG. 7, in some aspects, process 700 may include receiving an instruction to perform a radio optimization procedure that is based at least in part on the mechanical displacement capability, the radio optimization procedure including at least one of: an RLM procedure, an RRM procedure, or a beam management procedure (block 720). For example, the CPE (e.g., using reception component 902 and/or communication manager 906, depicted in FIG. 9) may receive an instruction to perform a radio optimization procedure that is based at least in part on the mechanical displacement capability, the radio optimization procedure including at least one of: an RLM procedure, an RRM procedure, or a beam management procedure, as described above (e.g., as described in connection with FIG. 5).

Process 700 may include additional aspects, such as any single aspect or any combination of aspects described below and/or in connection with one or more other processes described elsewhere herein.

In a first aspect, the indication of the mechanical displacement capability indicates at least one of a repositioning duration, a repositioning rate, or a displacement range (e.g., as described in connection with FIG. 5).

In a second aspect, the repositioning rate includes at least one of an average time-based repositioning rate, or an average frequency-based repositioning rate (e.g., as described in connection with FIG. 5).

In a third aspect, the displacement range includes an average displacement range (e.g., as described in connection with FIG. 5).

In a fourth aspect, the indication of the mechanical displacement capability includes a bitfield, and each bit of the bitfield maps to a respective quantized value of a range of values (e.g., as described in connection with FIG. 5).

In a fifth aspect, the range of values includes at least one of repositioning duration values, repositioning rate values, or displacement range values (e.g., as described in connection with FIG. 5).

In a sixth aspect, the indication of the mechanical displacement capability indicates a mechanical displacement capability power class (e.g., as described in connection with FIG. 5).

In a seventh aspect, the mechanical displacement capability power class characterizes a physical layer capability associated with the mechanical displacement capability power class (e.g., as described in connection with FIG. 5).

In an eighth aspect, the radio optimization procedure includes computing an inter-cell measurement metric using a timing condition that is based at least in part on the mechanical displacement capability (e.g., as described in connection with FIG. 5, FIG. 6A, and FIG. 6B).

In a ninth aspect, the timing condition is specified by a communication standard (e.g., as described in connection with FIG. 5, FIG. 6A, and FIG. 6B).

In a tenth aspect, the mechanical displacement capability includes a repositioning duration (e.g., as described in connection with FIG. 5).

In an eleventh aspect, the radio optimization procedure includes a beam management procedure, and process 700 includes performing the beam management procedure using multiple mechanical positions of the mechanical displacement capability (e.g., as described in connection with FIG. 5).

In a twelfth aspect, performing the beam management procedure includes using a timing condition that is based at least in part on the mechanical displacement capability (e.g., as described in connection with FIG. 5).

In a thirteenth aspect, process 700 includes receiving configuration information for the beam management procedure, and the configuration information is based at least in part on the mechanical displacement capability (e.g., as described in connection with FIG. 5).

In a fourteenth aspect, the configuration information includes a respective set of air interface resources for each mechanical position of the multiple mechanical positions (e.g., as described in connection with FIG. 5).

In a fifteenth aspect, the mechanical displacement capability includes at least one of an angular mechanical displacement, or a linear mechanical displacement (e.g., as described in connection with FIG. 5).

In a sixteenth aspect, the angular mechanical displacement includes at least one of a rotation angular mechanical displacement, or a reflection angular mechanical displacement (e.g., as described in connection with FIG. 5).

In a seventeenth aspect, the mechanical displacement capability includes at least one of an antenna panel mechanical displacement, or a reflector mechanical displacement (e.g., as described in connection with FIG. 5).

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
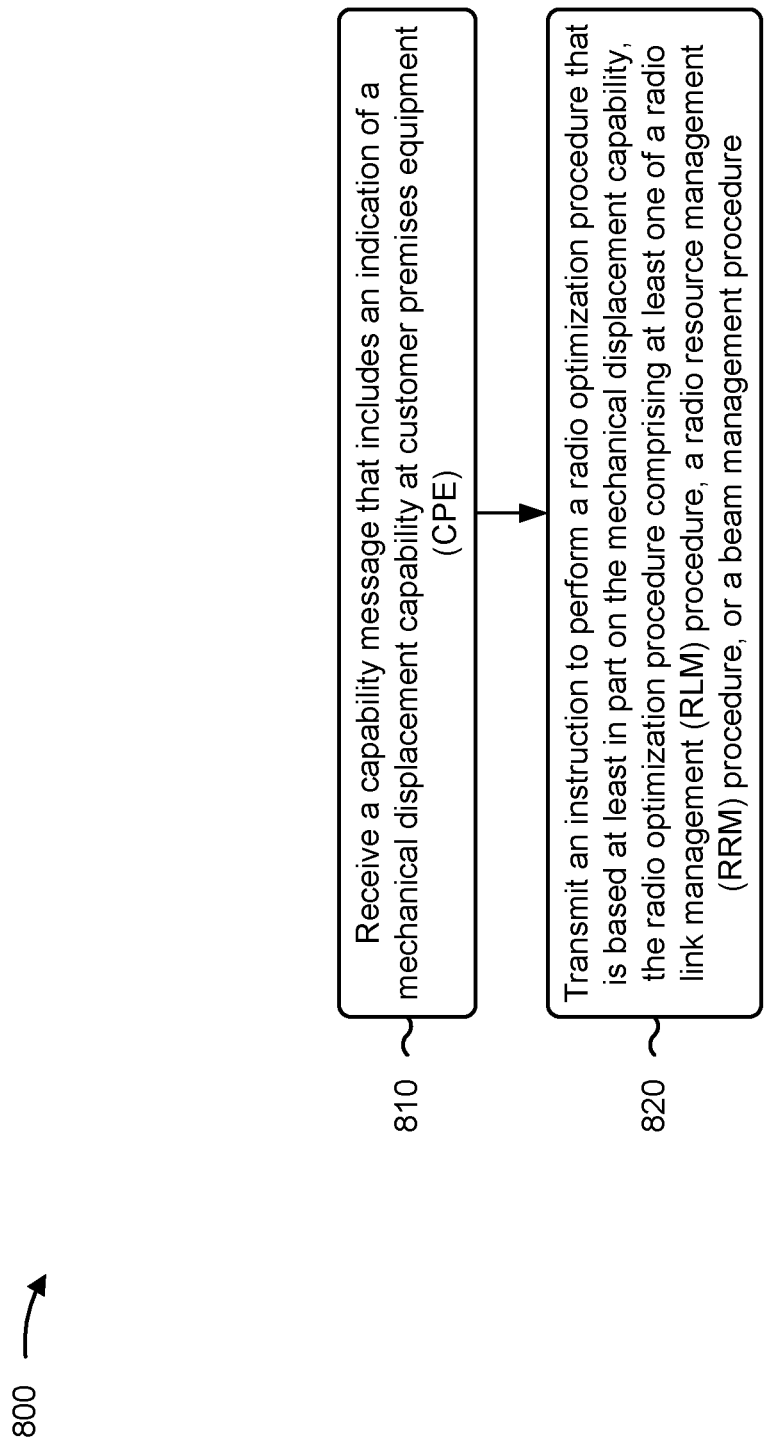
FIG. 8 is a diagram illustrating an example process performed, for example, at a network node or an apparatus of a network node, in accordance with the present disclosure.

FIG. 8 is a diagram illustrating an example process 800 performed, for example, at a network node or an apparatus of a network node, in accordance with the present disclosure. Example process 800 is an example where the apparatus or the network node (e.g., network node 110) performs operations associated with capability indication for a mechanical displacement at a CPE.

As shown in FIG. 8, in some aspects, process 800 may include receiving a capability message that includes an indication of a mechanical displacement capability at the CPE (block 810). For example, the network node (e.g., using reception component 1002 and/or communication manager 1006, depicted in FIG. 10) may receive a capability message that includes an indication of a mechanical displacement capability at the CPE, as described above (e.g., as described in connection with FIG. 5).

As further shown in FIG. 8, in some aspects, process 800 may include transmitting an instruction to perform a radio optimization procedure that is based at least in part on the mechanical displacement capability, the radio optimization procedure including at least one of: an RLM procedure, an RRM procedure, or a beam management procedure (block 820). For example, the network node (e.g., using transmission component 1004 and/or communication manager 1006, depicted in FIG. 10) may transmit an instruction to perform a radio optimization procedure that is based at least in part on the mechanical displacement capability, the radio optimization procedure including at least one of: an RLM procedure, an RRM procedure, or a beam management procedure, as described above (e.g., as described in connection with FIG. 5).

Process 800 may include additional aspects, such as any single aspect or any combination of aspects described below and/or in connection with one or more other processes described elsewhere herein.

In a first aspect, the indication of the mechanical displacement capability indicates at least one of a repositioning duration, a repositioning rate, or a displacement range (e.g., as described in connection with FIG. 5).

In a second aspect, the repositioning rate includes at least one of an average time-based repositioning rate, or an average frequency-based repositioning rate (e.g., as described in connection with FIG. 5).

In a third aspect, the displacement range includes an average displacement range (e.g., as described in connection with FIG. 5).

In a fourth aspect, the indication of the mechanical displacement capability includes a bitfield, and each bit of the bitfield maps to a respective quantized value of a range of values (e.g., as described in connection with FIG. 5).

In a fifth aspect, the range of values includes at least one of repositioning duration values, repositioning rate values, or displacement range values (e.g., as described in connection with FIG. 5).

In a sixth aspect, the indication of the mechanical displacement capability indicates a mechanical displacement capability power class (e.g., as described in connection with FIG. 5).

In a seventh aspect, the mechanical displacement capability power class characterizes a physical layer capability associated with the mechanical displacement capability power class (e.g., as described in connection with FIG. 5).

In an eighth aspect, the radio optimization procedure uses a timing condition that is based at least in part on the mechanical displacement capability (e.g., as described in connection with FIG. 5).

In a ninth aspect, the timing condition is specified by a communication standard (e.g., as described in connection with FIG. 5, FIG. 6A, and FIG. 6B).

In a tenth aspect, the mechanical displacement capability includes a repositioning duration (e.g., as described in connection with FIG. 5).

In an eleventh aspect, the radio optimization procedure includes a beam management procedure, and process 800 includes performing the beam management procedure based at least in part on multiple mechanical positions of the mechanical displacement capability of the CPE (e.g., as described in connection with FIG. 5).

In a twelfth aspect, performing the beam management procedure includes using a timing condition that is based at least in part on the mechanical displacement capability (e.g., as described in connection with FIG. 5).

In a thirteenth aspect, process 800 includes transmitting configuration information for the beam management procedure, and the configuration information is based at least in part on the mechanical displacement capability (e.g., as described in connection with FIG. 5).

In a fourteenth aspect, the configuration information includes a respective set of air interface resources for each mechanical position of the multiple mechanical positions (e.g., as described in connection with FIG. 5).

In a fifteenth aspect, the mechanical displacement capability includes at least one of an angular mechanical displacement, or a linear mechanical displacement (e.g., as described in connection with FIG. 5).

In a sixteenth aspect, the angular mechanical displacement includes at least one of a rotation angular mechanical displacement, or a reflection angular mechanical displacement (e.g., as described in connection with FIG. 5).

In a seventeenth aspect, the mechanical displacement capability includes at least one of an antenna panel mechanical displacement, or a reflector mechanical displacement (e.g., as described in connection with FIG. 5).

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
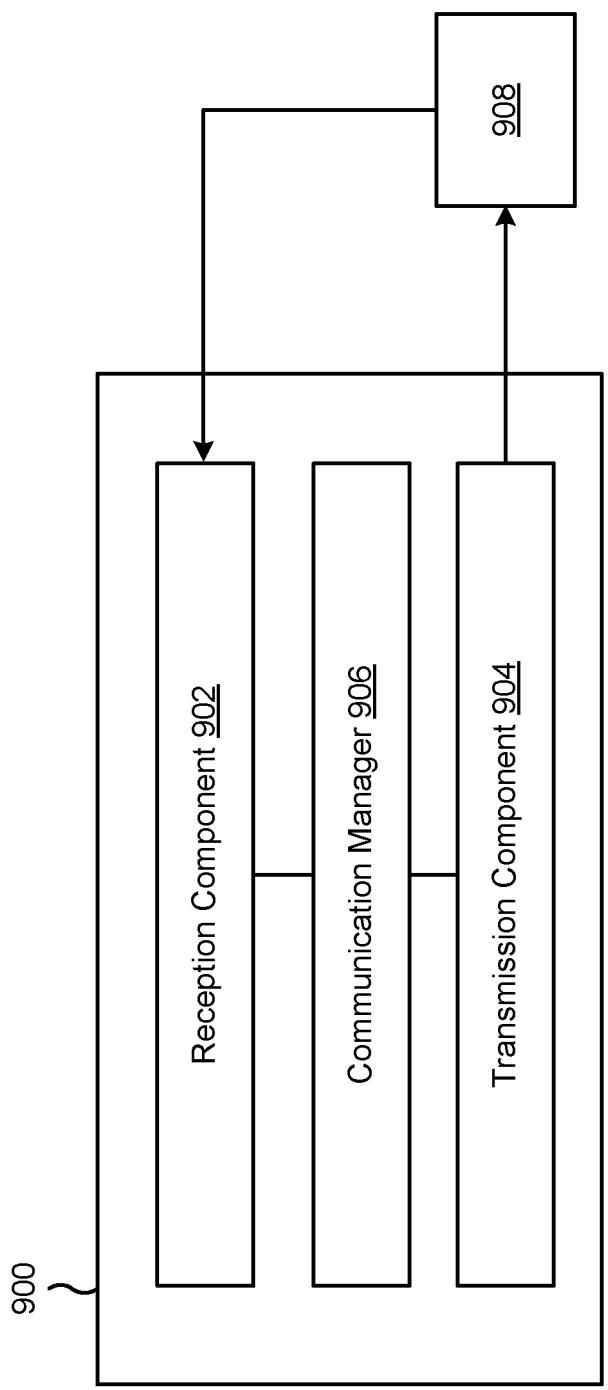
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a CPE, or a CPE may include the apparatus 900. In some aspects, the apparatus 900 includes a reception component 902, a transmission component 904, and/or a communication manager 906, which may be in communication with one another (for example, via one or more buses and/or one or more other components). In some aspects, the communication manager 906 is the communication manager 140 described in connection with FIG. 1. As shown, the apparatus 900 may communicate with another apparatus 908, such as a UE or a network node (such as a CU, a DU, an RU, or a base station), using the reception component 902 and the transmission component 904.

In some aspects, the apparatus 900 may be configured to perform one or more operations described herein in connection with FIGS. 4A-6B. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the CPE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 902 may receive communications, such as reference signals, control information, data communications, or a combination thereof, from the apparatus 908. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, one or more modems, one or more demodulators, one or more MIMO detectors, one or more receive processors, one or more controllers/processors, one or more memories, or a combination thereof, of the CPE described in connection with FIG. 2.

The transmission component 904 may transmit communications, such as reference signals, control information, data communications, or a combination thereof, to the apparatus 908. In some aspects, one or more other components of the apparatus 900 may generate communications and may provide the generated communications to the transmission component 904 for transmission to the apparatus 908. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 908. In some aspects, the transmission component 904 may include one or more antennas, one or more modems, one or more modulators, one or more transmit MIMO processors, one or more transmit processors, one or more controllers/processors, one or more memories, or a combination thereof, of the CPE described in connection with FIG. 2. In some aspects, the transmission component 904 may be co-located with the reception component 902 in one or more transceivers.

The communication manager 906 may support operations of the reception component 902 and/or the transmission component 904. For example, the communication manager 906 may receive information associated with configuring reception of communications by the reception component 902 and/or transmission of communications by the transmission component 904. Additionally, or alternatively, the communication manager 906 may generate and/or provide control information to the reception component 902 and/or the transmission component 904 to control reception and/or transmission of communications.

The transmission component 904 may transmit a capability message that includes an indication of a mechanical displacement capability at the CPE. The reception component 902 may receive an instruction to perform a radio optimization procedure that is based at least in part on the mechanical displacement capability, the radio optimization procedure including at least one of an RLM procedure, an RRM procedure, or a beam management procedure. In some aspects, the reception component 902 may receive configuration information for the beam management procedure, and the configuration information is based at least in part on the mechanical displacement capability.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
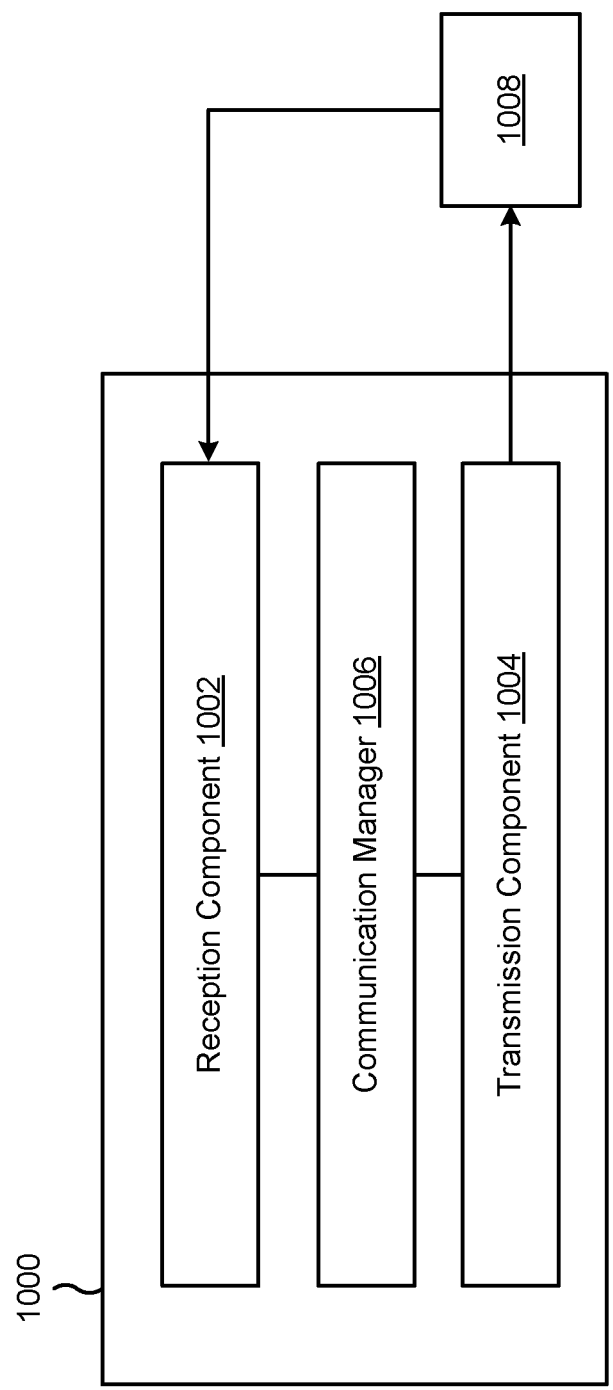
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 150 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4A-6B. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by one or more controllers or one or more processors to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, one or more modems, one or more demodulators, one or more MIMO detectors, one or more receive processors, one or more controllers/processors, one or more memories, or a combination thereof, of the network node described in connection with FIG. 2. In some aspects, the reception component 1002 and/or the transmission component 1004 may include or may be included in a network interface. The network interface may be configured to obtain and/or output signals for the apparatus 1000 via one or more communications links, such as a backhaul link, a midhaul link, and/or a fronthaul link.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, one or more modems, one or more modulators, one or more transmit MIMO processors, one or more transmit processors, one or more controllers/processors, one or more memories, or a combination thereof, of the network node described in connection with FIG. 2. In some aspects, the transmission component 1004 may be co-located with the reception component 1002 in one or more transceivers.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The reception component 1002 may receive a capability message that includes an indication of a mechanical displacement capability at a CPE. The transmission component 1004 may transmit an instruction to perform a radio optimization procedure that is based at least in part on the mechanical displacement capability, the radio optimization procedure including at least one of an RLM procedure, an RRM procedure, or a beam management procedure. In some aspects, the transmission component 1004 may transmit configuration information for the beam management procedure, and the configuration information is based at least in part on the mechanical displacement capability.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a customer premises equipment (CPE), comprising: transmitting a capability message that includes an indication of a mechanical displacement capability at the CPE; and receiving an instruction to perform a radio optimization procedure that is based at least in part on the mechanical displacement capability, the radio optimization procedure comprising at least one of: a radio link monitoring (RLM) procedure, a radio resource management (RRM) procedure, or a beam management procedure.

Aspect 2: The method of Aspect 1, wherein the indication of the mechanical displacement capability indicates at least one of: a repositioning duration, a repositioning rate, or a displacement range.

Aspect 3: The method of Aspect 2, wherein the repositioning rate comprises at least one of: an average time-based repositioning rate, or an average frequency-based repositioning rate.

Aspect 4: The method of Aspect 2 or Aspect 3, wherein the displacement range comprises an average displacement range.

Aspect 5: The method of any of Aspects 1-4, wherein the indication of the mechanical displacement capability comprises a bitfield, and wherein each bit of the bitfield maps to a respective quantized value of a range of values.

Aspect 6: The method of Aspect 5, wherein the range of values comprises at least one of: repositioning duration values, repositioning rate values, or displacement range values.

Aspect 7: The method of any of Aspects 1-6, wherein the indication of the mechanical displacement capability indicates a mechanical displacement capability power class.

Aspect 8: The method of Aspect 7, wherein the mechanical displacement capability power class characterizes a physical layer capability associated with the mechanical displacement capability power class.

Aspect 9: The method of any of Aspects 1-8, wherein the radio optimization procedure comprises: computing an inter-cell measurement metric using a timing condition that is based at least in part on the mechanical displacement capability.

Aspect 10: The method of Aspect 9, wherein the timing condition is specified by a communication standard.

Aspect 11: The method of Aspect 9 or Aspect 10, wherein the mechanical displacement capability comprises a repositioning duration.

Aspect 12: The method of any of Aspects 1-11, wherein the radio optimization procedure comprises a beam management procedure, and wherein the method further comprises: performing the beam management procedure using multiple mechanical positions of the mechanical displacement capability.

Aspect 13: The method of Aspect 12, wherein performing the beam management procedure comprises: using a timing condition that is based at least in part on the mechanical displacement capability.

Aspect 14: The method of Aspect 12 or Aspect 13, further comprising: receiving configuration information for the beam management procedure, wherein the configuration information is based at least in part on the mechanical displacement capability.

Aspect 15: The method of Aspect 14, wherein the configuration information comprises a respective set of air interface resources for each mechanical position of the multiple mechanical positions.

Aspect 16: The method of any of Aspects 1-15, wherein the mechanical displacement capability comprises at least one of: an angular mechanical displacement, or a linear mechanical displacement.

Aspect 17: The method of Aspect 16, wherein the angular mechanical displacement comprises at least one of: a rotation angular mechanical displacement, or a reflection angular mechanical displacement.

Aspect 18: The method of Aspect 16 or Aspect 17, wherein the mechanical displacement capability comprises at least one of: an antenna panel mechanical displacement, or a reflector mechanical displacement.

Aspect 19: A method of wireless communication performed by a network node, comprising: receiving a capability message that includes an indication of a mechanical displacement capability at customer premises equipment (CPE); and transmitting an instruction to perform a radio optimization procedure that is based at least in part on the mechanical displacement capability, the radio optimization procedure comprising at least one of: a radio link monitoring (RLM) procedure, a radio resource management (RRM) procedure, or a beam management procedure.

Aspect 20: The method of Aspect 19, wherein the indication of the mechanical displacement capability indicates at least one of: a repositioning duration, a repositioning rate, or a displacement range.

Aspect 21: The method of Aspect 20, wherein the repositioning rate comprises at least one of: an average time-based repositioning rate, or an average frequency-based repositioning rate.

Aspect 22: The method of Aspect 20 or Aspect 21, wherein the displacement range comprises an average displacement range.

Aspect 23: The method of any of Aspects 19-22, wherein the indication of the mechanical displacement capability comprises a bitfield, and wherein each bit of the bitfield maps to a respective quantized value of a range of values.

Aspect 24: The method of Aspect 23, wherein the range of values comprises at least one of: repositioning duration values, repositioning rate values, or displacement range values.

Aspect 25: The method of any of Aspects 19-24, wherein the indication of the mechanical displacement capability indicates a mechanical displacement capability power class.

Aspect 26: The method of Aspect 25, wherein the mechanical displacement capability power class characterizes a physical layer capability associated with the mechanical displacement capability power class.

Aspect 27: The method of any of Aspects 19-26, wherein the radio optimization procedure uses a timing condition that is based at least in part on the mechanical displacement capability.

Aspect 28: The method of Aspect 27, wherein the timing condition is specified by a communication standard.

Aspect 29: The method of Aspect 27 or Aspect 28, wherein the mechanical displacement capability comprises a repositioning duration.

Aspect 30: The method of any of Aspects 19-29, wherein the radio optimization procedure comprises a beam management procedure, and wherein the method further comprises: performing the beam management procedure based at least in part on multiple mechanical positions of the mechanical displacement capability of the CPE.

Aspect 31: The method of Aspect 30, wherein performing the beam management procedure comprises: using a timing condition that is based at least in part on the mechanical displacement capability.

Aspect 32: The method of Aspect 31, further comprising: transmitting configuration information for the beam management procedure, wherein the configuration information is based at least in part on the mechanical displacement capability.

Aspect 33: The method of Aspect 32, wherein the configuration information comprises a respective set of air interface resources for each mechanical position of the multiple mechanical positions.

Aspect 34: The method of any of Aspects 19-33, wherein the mechanical displacement capability comprises at least one of: an angular mechanical displacement, or a linear mechanical displacement.

Aspect 35: The method of Aspect 34, wherein the angular mechanical displacement comprises at least one of: a rotation angular mechanical displacement, or a reflection angular mechanical displacement.

Aspect 36: The method of Aspect 34 or Aspect 35, wherein the mechanical displacement capability comprises at least one of: an antenna panel mechanical displacement, or a reflector mechanical displacement.

Aspect 37: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 1-18.

Aspect 38: An apparatus for wireless communication at a device, the apparatus comprising one or more memories and one or more processors coupled to the one or more memories, the one or more processors configured, individually or collectively, to cause the device to perform the method of one or more of Aspects 1-18.

Aspect 39: An apparatus for wireless communication, the apparatus comprising at least one means for performing the method of one or more of Aspects 1-18.

Aspect 40: A non-transitory computer-readable medium storing code for wireless communication, the code comprising instructions executable by one or more processors to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: A device for wireless communication, the device comprising a processing system that includes one or more processors and one or more memories coupled with the one or more processors, the processing system configured to cause the device to perform the method of one or more of Aspects 1-18.

Aspect 43: An apparatus for wireless communication at a device, the apparatus comprising one or more memories and one or more processors coupled to the one or more memories, the one or more processors individually or collectively configured to cause the device to perform the method of one or more of Aspects 1-18.

Aspect 44: An apparatus for wireless communication at a device, the apparatus comprising one or more processors; one or more memories coupled with the one or more processors; and instructions stored in the one or more memories and executable by the one or more processors to cause the apparatus to perform the method of one or more of Aspects 19-36.

Aspect 45: An apparatus for wireless communication at a device, the apparatus comprising one or more memories and one or more processors coupled to the one or more memories, the one or more processors configured, individually or collectively, to cause the device to perform the method of one or more of Aspects 19-36.

Aspect 46: An apparatus for wireless communication, the apparatus comprising at least one means for performing the method of one or more of Aspects 19-36.

Aspect 47: A non-transitory computer-readable medium storing code for wireless communication, the code comprising instructions executable by one or more processors to perform the method of one or more of Aspects 19-36.

Aspect 48: A non-transitory computer-readable medium storing a set of instructions for wireless communication, the set of instructions comprising one or more instructions that, when executed by one or more processors of a device, cause the device to perform the method of one or more of Aspects 19-36.

Aspect 49: A device for wireless communication, the device comprising a processing system that includes one or more processors and one or more memories coupled with the one or more processors, the processing system configured to cause the device to perform the method of one or more of Aspects 19-36.

Aspect 50: An apparatus for wireless communication at a device, the apparatus comprising one or more memories and one or more processors coupled to the one or more memories, the one or more processors individually or collectively configured to cause the device to perform the method of one or more of Aspects 19-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and at least one of software or firmware. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein. A component being configured to perform a function means that the component has a capability to perform the function, and does not require the function to be actually performed by the component, unless noted otherwise.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based on or otherwise in association with" unless explicitly stated otherwise. Also, as used herein, the term "or" is intended to be inclusive when used in a series and may be used interchangeably with "and/or," unless explicitly stated otherwise (for example, if used in combination with "either" or "only one of"). It should be understood that "one or more" is equivalent to "at least one."

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set.

What is claimed is:

1. An apparatus for wireless communication at a customer premises equipment (CPE), comprising:
   one or more memories; and
   one or more processors, coupled to the one or more memories, the one or more processors configured, individually or collectively, to cause the CPE to:
   transmit a capability message that includes an indication of a mechanical displacement capability at the CPE, wherein the mechanical displacement capability comprises one or more of an antenna panel mechanical displacement capability or a reflector mechanical displacement capability; and receive an instruction to perform a radio optimization procedure that is based at least in part on the mechanical displacement capability, the radio optimization procedure comprising at least one of:
a radio link monitoring (RLM) procedure,
a radio resource management (RRM) procedure, or
a beam management procedure.

2. The apparatus of claim 1, wherein the indication of the mechanical displacement capability indicates at least one of:
a repositioning duration,
a repositioning rate, or
a displacement range.

3. The apparatus of claim 1, wherein the indication of the mechanical displacement capability comprises a bitfield, and wherein each bit of the bitfield maps to a respective quantized value of a range of values.

4. The apparatus of claim 1, wherein the indication of the mechanical displacement capability indicates a mechanical displacement capability power class.

5. The apparatus of claim 1, wherein the one or more processors are further configured to cause the CPE to:
compute an inter-cell measurement metric using a timing condition that is based at least in part on the mechanical displacement capability.

6. The apparatus of claim 1, wherein the radio optimization procedure comprises the beam management procedure, and wherein the one or more processors are further configured to cause the CPE to:
perform the beam management procedure using multiple mechanical positions of the mechanical displacement capability.

7. The apparatus of claim 6, wherein the one or more processors, to cause the CPE to perform the beam management procedure, are configured to cause the CPE to:
use a timing condition that is based at least in part on the mechanical displacement capability.

8. The apparatus of claim 6, wherein the one or more processors are further configured to cause the CPE to:
receive configuration information for the beam management procedure, wherein the configuration information is based at least in part on the mechanical displacement capability.

9. The apparatus of claim 1, wherein the mechanical displacement capability comprises at least one of:
an angular mechanical displacement, or
a linear mechanical displacement.

10. An apparatus for wireless communication at a network node, comprising:
one or more memories; and
one or more processors, coupled to the one or more memories, the one or more processors configured, individually or collectively, to cause the network node to:
receive a capability message that includes an indication of a mechanical displacement capability at a customer premises equipment (CPE), wherein the mechanical displacement capability comprises one or more of an antenna panel mechanical displacement capability or a reflector mechanical displacement capability; and
transmit an instruction to perform a radio optimization procedure that is based at least in part on the mechanical displacement capability, the radio optimization procedure comprising at least one of:
a radio link monitoring (RLM) procedure,
a radio resource management (RRM) procedure, or
a beam management procedure.

11. The apparatus of claim 10, wherein the indication of the mechanical displacement capability indicates at least one of:
a repositioning duration,
a repositioning rate, or
a displacement range.

12. The apparatus of claim 10, wherein the indication of the mechanical displacement capability comprises a bitfield, and wherein each bit of the bitfield maps to a respective quantized value of a range of values.

13. The apparatus of claim 10, wherein the indication of the mechanical displacement capability indicates a mechanical displacement capability power class.

14. The apparatus of claim 10, wherein the radio optimization procedure uses a timing condition that is based at least in part on the mechanical displacement capability.

15. The apparatus of claim 10, wherein the radio optimization procedure comprises the beam management procedure, and wherein the one or more processors are further configured to cause the network node to:
perform the beam management procedure based at least in part on multiple mechanical positions of the mechanical displacement capability of the CPE.

16. A method of wireless communication performed by a customer premises equipment (CPE), comprising:
transmitting a capability message that includes an indication of a mechanical displacement capability at the CPE, wherein the mechanical displacement capability comprises one or more of an antenna panel mechanical displacement capability or a reflector mechanical displacement capability; and
receiving an instruction to perform a radio optimization procedure that is based at least in part on the mechanical displacement capability, the radio optimization procedure comprising at least one of:
a radio link monitoring (RLM) procedure,
a radio resource management (RRM) procedure, or
a beam management procedure.

17. The method of claim 16, wherein the indication of the mechanical displacement capability comprises a bitfield, and wherein each bit of the bitfield maps to a respective quantized value of a range of values.

18. The method of claim 16, wherein the indication of the mechanical displacement capability indicates a mechanical displacement capability power class.

19. The method of claim 16, wherein the radio optimization procedure comprises the beam management procedure, and wherein the method further comprises:
performing the beam management procedure using multiple mechanical positions of the mechanical displacement capability.

20. The method of claim 19, wherein performing the beam management procedure comprises:
using a timing condition that is based at least in part on the mechanical displacement capability.

* * * * *